US012646186B2

(12) United States Patent
Katsuyama

(10) Patent No.: US 12,646,186 B2
(45) Date of Patent: Jun. 2, 2026

(54) IMAGE ANALYSIS DEVICE, METHOD, AND PROGRAM

(71) Applicant: FUJIFILM Corporation, Tokyo (JP)

(72) Inventor: Kimito Katsuyama, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 235 days.

(21) Appl. No.: 18/431,895

(22) Filed: Feb. 2, 2024

(65) Prior Publication Data

US 2024/0177325 A1     May 30, 2024

Related U.S. Application Data

(63) Continuation of application No. PCT/JP2022/027056, filed on Jul. 8, 2022.

(30) Foreign Application Priority Data

Aug. 24, 2021     (JP) ................................ 2021-136425

(51) Int. Cl.
*G06T 7/30*          (2017.01)
*G06T 5/20*          (2006.01)
*G06T 7/00*          (2017.01)

(52) U.S. Cl.
CPC .................. *G06T 7/30* (2017.01); *G06T 5/20* (2013.01); *G06T 7/0002* (2013.01); *G06T 2207/10048* (2013.01); *G06T 2207/30168* (2013.01)

(58) Field of Classification Search
CPC ........ G01N 25/72; G01N 33/383; G06T 5/20; G06T 5/50; G06T 7/0002; G06T 7/30; G06T 7/32
See application file for complete search history.

(56) References Cited

U.S. PATENT DOCUMENTS 7,553,070 B2 * 6/2009 Kollgaard .............. G01N 25/72
                                                    250/341.1
2010/0260374 A1   10/2010 Akashi et al.
                    (Continued)

FOREIGN PATENT DOCUMENTS

CN          201489503 U      5/2010
CN          106716089 A      5/2017
                    (Continued)

OTHER PUBLICATIONS

Hashimoto, Kazuaki et al., "Considerations in infrared camera imaging with different detection wavelength ranges", 65th Japan Society of Civil Engineers (JSCE) Annual Meeting, Sep. 2010, pp. 319-320.

(Continued)

*Primary Examiner* — Katrina R Fujita
(74) *Attorney, Agent, or Firm* — Studebaker Brackett PLLC

(57)          ABSTRACT

An image analysis device includes a processor. An infrared thermal image acquisition unit 100 of the processor acquires a first infrared thermal image and a second infrared thermal image obtained by imaging the object from different imaging positions, respectively. A registration unit 110 of the processor performs registration of the first infrared thermal image and the second infrared thermal image. A first processing unit 120 of the processor executes first processing including at least one of discrimination processing, suppression processing, or enhancement processing of background reflection of infrared light from the periphery of the object on an infrared thermal image obtained by imaging the object based on a difference between a temperature distribution of the first infrared thermal image and a temperature distribution of the second infrared thermal image after the registration.

10 Claims, 13 Drawing Sheets

(56) References Cited

U.S. PATENT DOCUMENTS

| | | | |
|---|---|---|---|
| 2012/0229681 A1 | 9/2012 | Ansfield et al. | |
| 2017/0176258 A1 | 6/2017 | Kitagawa | |
| 2018/0342074 A1 | 11/2018 | Sakamoto | |
| 2019/0287268 A1* | 9/2019 | Klapp | G06T 7/254 |
| 2021/0319590 A1* | 10/2021 | Gulde | G06T 5/50 |
| 2021/0390675 A1 | 12/2021 | Noda | |
| 2022/0148192 A1* | 5/2022 | Kurihara | G06T 7/194 |
| 2022/0253973 A1 | 8/2022 | Kominami et al. | |

FOREIGN PATENT DOCUMENTS

| | | | |
|---|---|---|---|
| CN | 211403018 U | 9/2020 |
| JP | 2005-140622 A | 6/2005 |
| JP | 2011-198099 A | 10/2011 |
| JP | 2011-243037 A | 12/2011 |
| JP | 2013-153350 A | 8/2013 |
| JP | 2018-197674 A | 12/2018 |
| JP | 2021-018705 A | 2/2021 |
| JP | 6857432 B1 | 4/2021 |
| WO | 2010/046967 A1 | 4/2010 |
| WO | 2016/052417 A1 | 4/2016 |
| WO | 2021/070444 A1 | 4/2021 |

OTHER PUBLICATIONS

International Search Report issued in PCT/JP2022/027056; mailed Aug. 9, 2022.

International Preliminary Report On Patentability (Chapter I) and Written Opinion of the International Searching Authority issued in PCT/JP2022/027056; issued Feb. 27, 2024.

An Office Action; mailed by the China National Intellectual Property Administration of the People's Republic of China on Mar. 24, 2026, which corresponds to Chinese U.S. Appl. No. 18/431,895.8 and is related to U.S. Appl. No. 18/431,895.

"Notice of Reasons for Refusal" Office Action issued in JP 2023-543739; mailed by the Japanese Patent Office on Apr. 21, 2026.

* cited by examiner (IMAGING POSITION P2 OF SECOND
INFRARED THERMAL IMAGE I₂)

(IMAGING POSITION P1 OF FIRST
INFRARED THERMAL IMAGE I₁)

REGION (0)
REGION (1)
REGION (2)
REGION (3)
REGION (4)
REGION (5)

R1

REGION (0)
REGION (1)
REGION (2)
REGION (3)
REGION (4)
REGION (5)

I₁ r1

REGION (0)

REGION (1)

REGION (2)

REGION (3)

$I_1$ r1

R1

REGION (0)

REGION (1)

REGION (2)

REGION (3)

$I_{2-1}$

R2 r3

IMAGE ANALYSIS DEVICE, METHOD, AND PROGRAM

CROSS-REFERENCE TO RELATED APPLICATIONS

The present application is a Continuation of PCT International Application No. PCT/JP2022/027056 filed on Jul. 8, 2022 claiming priority under 35 U.S.C § 119(a) to Japanese Patent Application No. 2021-136425 filed on Aug. 24, 2021. Each of the above applications is hereby expressly incorporated by reference, in its entirety, into the present application.

BACKGROUND OF THE INVENTION

1. Field of the Invention

The present invention relates to an image analysis device, a method, and a program, and in particular, to a technique that executes discrimination processing or the like of background reflection of infrared light from a periphery of an object on an infrared thermal image obtained by imaging the object.

2. Description of the Related Art

There is known a technique that discriminates defective parts, such as floating or delaminated parts, and sound parts included in an object using an infrared thermal image acquired by imaging the object, such as a concrete structure, with an infrared camera. In a case where a defective part is in the object, a temperature difference arises between a surface temperature of the defective part and a surface temperature of the sound part. Accordingly, in a case where, in the infrared thermal image, a portion is different in surface temperature from the periphery, discrimination can be made that a defective part is inside the portion (see JP2005-140622A).

SUMMARY OF THE INVENTION

"Considerations in infrared camera imaging with different detection wavelength ranges", 65th Japan Society of Civil Engineers (JSCE) Annual Meeting (September 2010), describes the following problems about a nondestructive inspection by an infrared camera of the related art.

The infrared camera is constantly influenced by a thermal environment in the periphery of the object as well as emission of infrared light from the object. The infrared camera also captures infrared light that is incident on and reflected from a surface of the object from the periphery of the object, in addition to infrared light from the surface of the object, and converts infrared light into a temperature.

In a case where the surface of the object is smooth and has a strong specular reflection property (has low emissivity (has high reflectivity)), the reflection of infrared light from the periphery of the object appears as a peculiar temperature distribution, and causes erroneous detection in discrimination of a defective part, such as "floating", included in the object (in the following description, the reflection of infrared light from the periphery of the object is called "background reflection").

The present invention has been accomplished in view of such a situation, and an object of the present invention is to provide an image analysis device, a method, and a program capable of executing discrimination processing or the like of background reflection of infrared light from a periphery of an object on an infrared thermal image obtained by imaging the object.

To attain the above-described object, there is provided an image analysis device according to a first aspect of the present invention comprising a processor, in which the processor is configured to execute image acquisition processing of acquiring a first infrared thermal image and a second infrared thermal image obtained by imaging an object from different imaging positions, respectively, and execute first processing including at least one of discrimination processing, suppression processing, or enhancement processing of background reflection of infrared light from a periphery of the object on an infrared thermal image obtained by imaging the object based on at least a difference between a temperature distribution of the first infrared thermal image and a temperature distribution of the second infrared thermal image.

According to the first aspect of the present invention, because the first infrared thermal image and the second infrared thermal image obtained by imaging the object from different imaging positions, respectively, are acquired, a position where infrared light from the periphery of the object is specularly reflected from a portion where the surface of the object is smooth and produces glare is different between the first infrared thermal image and the second infrared thermal image. Accordingly, it is possible to execute the first processing including at least one of the discrimination processing, the suppression processing, or the enhancement processing of the background reflection of the infrared light based on the difference between the temperature distribution of the first infrared thermal image and the temperature distribution of the second infrared thermal image.

In an image analysis device according to a second aspect of the present invention, it is preferable that the processor is configured to execute the first processing based on a difference in position of the temperature distribution with respect to a surface of the object.

In an image analysis device according to a third aspect of the present invention, it is preferable that the processor is configured to perform registration for associating values of the first infrared thermal image and the second infrared thermal image with respect to a same point on a surface of the object, and execute the first processing based on the first infrared thermal image and the second infrared thermal image subjected to the registration. As a result, it is possible to accurately obtain the difference in temperature distribution in the first infrared thermal image and the second infrared thermal image, and to execute the first processing with high accuracy.

In an image analysis device according to a fourth aspect of the present invention, it is preferable that the processor is configured to acquire each of first information indicating a first imaging position and a first imaging direction corresponding to the first infrared thermal image and second information indicating a second imaging position and a second imaging direction corresponding to the second infrared thermal image, and execute the first processing based on at least the first infrared thermal image, the second infrared thermal image, the first information, and the second information. With the use of the first information and the second information, it is possible to perform high-accuracy registration of the first infrared thermal image and the second infrared thermal image, and to execute the first processing with high accuracy.

In an image analysis device according to a fifth aspect of the present invention, it is preferable that the processor is configured to acquire a first non-infrared thermal image and a second non-infrared thermal image corresponding to the first infrared thermal image and the second infrared thermal image, respectively, and execute the first processing based on at least the first infrared thermal image, the second infrared thermal image, the first non-infrared thermal image, and the second non-infrared thermal image.

In an image analysis device according to a sixth aspect of the present invention, it is preferable that the processor is configured to perform registration for associating values of the first infrared thermal image and the second infrared thermal image with respect to a same point on a surface of the object based on at least the first infrared thermal image, the second infrared thermal image, the first non-infrared thermal image, and the second non-infrared thermal image.

With the use of the first non-infrared thermal image and the second non-infrared thermal image having less background reflection of the infrared light, it is possible to perform high-accuracy registration of the first infrared thermal image and the second infrared thermal image, and to execute the first processing with high accuracy. The first non-infrared thermal image and the second non-infrared thermal image can be, for example, visible light images, and in this case, because the first non-infrared thermal image and the second non-infrared thermal image have a lot of texture to be a key for performing registration and are sharp and clear compared to the first infrared thermal image and the second infrared thermal image, consequently, it is possible to perform high-accuracy registration, and to execute the first processing with high accuracy.

In an image analysis device according to a seventh aspect of the present invention, it is preferable that the processor is configured to acquire three-dimensional information indicating a surface shape of the object, and execute the first processing based on at least the first infrared thermal image, the second infrared thermal image, and the three-dimensional information. The three-dimensional information indicating the surface shape of the object can be acquired by various methods. For example, the three-dimensional information of the object surface can be acquired by measuring a distance to each point on the object surface using a distance measurement method, such as light detection and ranging (LiDAR), a stereo camera, a time of flight camera (TOF camera), or an ultrasonic sensor. With the use of the three-dimensional information, it is possible to perform high-accuracy registration of the first infrared thermal image and the second infrared thermal image, and to execute the first processing with high accuracy.

In an image analysis device according to an eighth aspect of the present invention, it is preferable that the processor is configured to execute the discrimination processing of the background reflection, and execute processing including at least one of the suppression processing or the enhancement processing of the background reflection based on at least a discrimination result of the background reflection.

Because a region of the background reflection is known from the discrimination result of the background reflection, it is possible to execute the suppression processing of the background reflection of suppressing the background reflection and the enhancement processing of the background reflection of enhancing the background reflection by separating a temperature distribution by the background reflection and a temperature distribution of the object surface in the region of the background reflection.

There is provided an image analysis method according to a ninth aspect of the present invention that is executed by a processor, the method comprising a step of acquiring a first infrared thermal image and a second infrared thermal image obtained by imaging an object from different imaging positions, respectively, and a step of executing processing including at least one of discrimination processing, suppression processing, or enhancement processing of background reflection of infrared light from a periphery of the object on an infrared thermal image obtained by imaging the object based on at least a difference between a temperature distribution of the first infrared thermal image and a temperature distribution of the second infrared thermal image.

There is provided an image analysis program according to a tenth aspect of the present invention that causes a computer to realize a function of acquiring a first infrared thermal image and a second infrared thermal image obtained by imaging an object from different imaging positions, respectively, and a function of executing processing including at least one of discrimination processing, suppression processing, or enhancement processing of background reflection of infrared light from a periphery of the object on an infrared thermal image obtained by imaging the object based on at least a difference between a temperature distribution of the first infrared thermal image and a temperature distribution of the second infrared thermal image.

According to the present invention, it is possible to execute the first processing including at least one of the discrimination processing, the suppression processing, or the enhancement processing of background reflection of infrared light from the periphery of the object on the infrared thermal image obtained by imaging the object, and to prevent erroneous detection or oversight due to background reflection in a nondestructive inspection of the object using the infrared thermal image.

DESCRIPTION OF THE PREFERRED EMBODIMENTS

Hereinafter, a preferred embodiment of an image analysis device, a method, and a program according to the present invention will be described with reference to the accompanying drawings.

[Hardware Configuration of Image Analysis Device]

Figure 1:
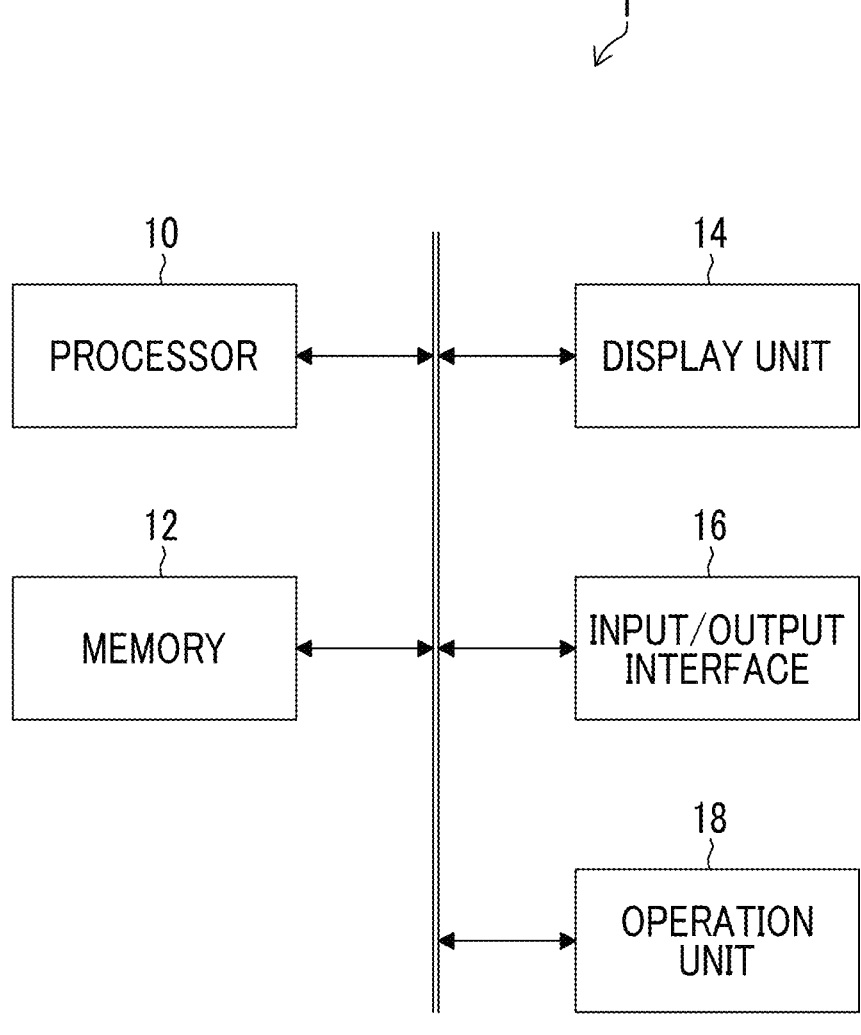
FIG. 1 is a block diagram showing an embodiment of a hardware configuration of an image analysis device according to the present invention.

FIG. 1 is a block diagram showing an embodiment of a hardware configuration of an image analysis device according to the present invention.

An image analysis device 1 shown in FIG. 1 analyzes an infrared thermal image obtained by imaging an object, such as a bridge, a tunnel, or other concrete structures, with an infrared camera and discriminates an internal defect (floating or the like) included in the object. The image analysis device 1 is configured with a personal computer, a workstation, or the like, and comprises a processor 10, a memory 12, a display unit 14, an input/output interface 16, an operation unit 18, and the like.

Figure 3:
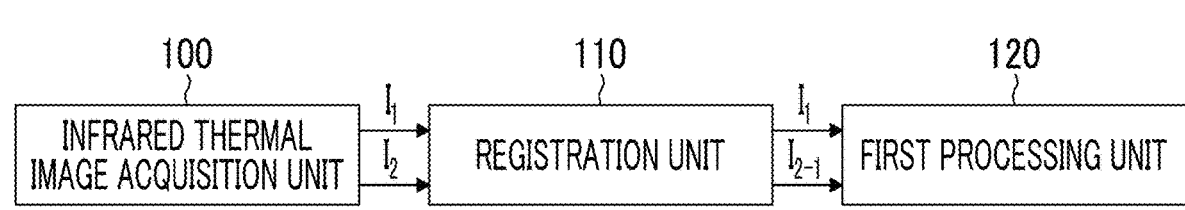
FIG. 3 is a functional block diagram showing a first embodiment of an image analysis device according to the present invention.

The processor 10 is configured with a central processing unit (CPU) or the like, and integrally controls the units of the image analysis device 1 and functions as, for example, an infrared thermal image acquisition unit 100, a registration unit 110, and a first processing unit 120 shown in FIG. 3.

The memory 12 includes a flash memory, a read-only memory (ROM), a random-access memory (RAM), a hard disk device, and the like. The flash memory, the ROM, or the hard disk device is a non-volatile memory that stores an operating system, various programs including an image analysis program according to the present invention, and the like. The RAM functions as a work area of processing by the processor 10. The RAM temporarily stores the image analysis program and the like stored in the flash memory or the like. The processor 10 may incorporate a part (RAM) of the memory 12.

The processor 10 acquires an infrared thermal image via the input/output interface 16, controls the units of the image analysis device 1, and executes processing according to the image analysis program while using the RAM as a work area.

The display unit 14 displays an analysis result (infrared thermal image after processing, or the like) of the infrared thermal image by the image analysis device 1. A user checks the infrared thermal image or the like displayed on the display unit 14 to determine the presence or absence of an internal defect of the object. The display unit 14 is also used as a part of a graphical user interface (GUI) in a case where an input instruction or the like of the infrared thermal image obtained by imaging the object is received from the operation unit 18.

The input/output interface 16 includes a connection that can be connected to external equipment, a communication unit that can be connected to a network, and the like. As the connection unit that can be connected to the external equipment, a Universal Serial Bus (USB), a high-definition multimedia interface (HDMI (Registered Trademark)), or the like can be applied. The processor 10 can acquire the infrared thermal image and the like captured by the infrared camera via the input/output interface 16. Instead of the display unit 14, external display equipment connected to the input/output interface 16 can be used.

The operation unit 18 includes a keyboard, a pointing device, such as a mouse, and the like, and functions as a part of a GUI that receives various designations by the user.

[Outline of the Present Invention]

Figure 2:
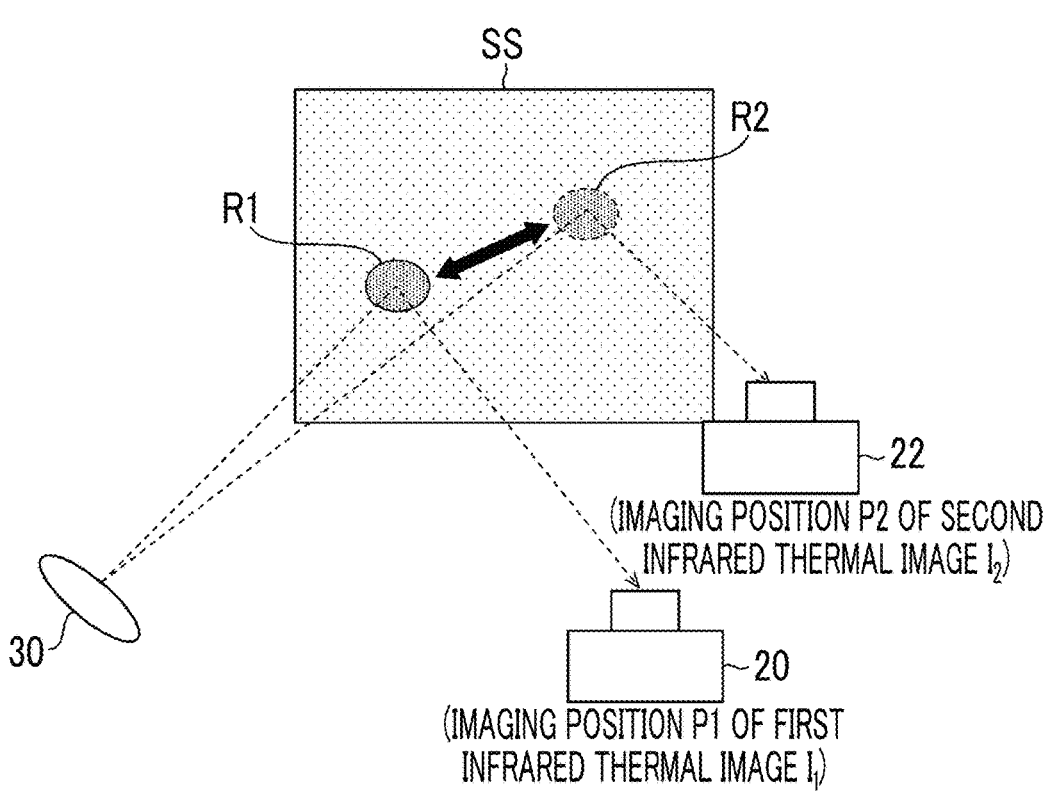
FIG. 2 is a schematic view illustrating an outline of the present invention.

FIG. 2 is a schematic view illustrating an outline of the present invention.

As shown in FIG. 2, two infrared thermal images (first infrared thermal image I₁ and second infrared thermal image I₂) obtained by imaging the object from two different imaging positions P1 and P2 with infrared cameras 20 and 22 are considered. In FIG. 2, SS indicates a surface of the object.

In the first infrared thermal image $I_1$ and the second infrared thermal image $I_2$, a position on the surface SS of the object of a temperature distribution due to infrared light emitted from the surface SS of the object is naturally not changed.

On the other hand, in a case where infrared light (for example, infrared light emitted from another structure, such as a road, or the surrounding nature, such as a river, infrared light emitted from a person or an animal, sky emission, or sunlight) from another infrared radiation source 30 in a periphery of the object is incident on and reflected from the surface SS (in particular, a surface that is smooth and has a strong specular reflection property) of the object, and produces glare on the infrared thermal image, the positions of the temperature distributions of background reflection in the first infrared thermal image $I_1$ and the second infrared thermal image $I_2$, on the surface SS of the object are different. As shown in FIG. 2, this is because the position of specular reflection of infrared light from the infrared radiation source 30 in the periphery of the object, which produces glare on the infrared thermal image, on the surface SS of the object changes depending on an imaging position, that is, because the position of specular reflection of infrared light is different between the imaging position P1 and the imaging position P2 (because the position of specular reflection of infrared light is different between the first infrared thermal image $I_1$ and the second infrared thermal image $I_2$).

In FIG. 2, R1 indicates, on the surface SS of the object, a temperature distribution by specular reflection of infrared light from the infrared radiation source 30 in the periphery of the object, which produces glare on the first infrared thermal image $I_1$, on the surface SS of the object, R2 indicates, on the surface SS of the object, a temperature distribution by specular reflection of infrared light from the infrared radiation source 30 in the periphery of the object, which produces glare on the second infrared thermal image $I_2$, on the surface SS of the object, and the positions of both temperature distributions on the surface SS of the object are different.

Accordingly, it is possible to discriminate whether or not a peculiar temperature distribution results from reflection (background reflection) of infrared light on the surface of the object, based on a difference in position of the peculiar temperature distribution with respect to the surface SS of the object on the first infrared thermal image $I_1$ and the second infrared thermal image $I_2$, and as described below, to execute processing (first processing) including at least one of discrimination processing, suppression processing, or enhancement processing of background reflection.

First Embodiment of Image Analysis Device

FIG. 3 is a functional block diagram showing a first embodiment of an image analysis device according to the present invention.

In the image analysis device of the first embodiment shown in FIG. 3, the processor 10 of the image analysis device 1 having the hardware configuration shown in FIG. 1 functions as an infrared thermal image acquisition unit (image acquisition unit) 100, a registration unit 110, and a first processing unit 120.

The infrared thermal image acquisition unit 100 executes image acquisition processing of acquiring the first infrared thermal image $I_1$ and the second infrared thermal image $I_2$ obtained by imaging the same object with the infrared cameras 20 and 22 at different imaging positions P1 and P2 as shown in FIG. 2, via the input/output interface 16 based on a user's operation on the operation unit 18. The infrared cameras 20 and 22 may be the same infrared camera with the imaging position moved or may be separate infrared cameras.

The registration unit 110 performs registration of the first infrared thermal image $I_1$ and the second infrared thermal image $I_2$ of the same object captured by the infrared cameras 20 and 22 at different imaging positions.

That is, the registration unit 110 performs registration such that the positions in the first infrared thermal image $I_1$ and the second infrared thermal image $I_2$ with respect to the same point on an object surface match each other. As long as values of the first infrared thermal image $I_1$ and the second infrared thermal image $I_2$ corresponding to each point (the same point) on the object surface can be associated with each other by the registration unit 110, first processing described below can be executed. That is, the "registration" by the registration unit 110 means that "the values of the first infrared thermal image $I_1$ and the second infrared thermal image $I_2$ corresponding to each point (the same point) on the object surface are associated with each other" described above. Note that, for description, images registered such that positions corresponding to the same point on the object surface match each other are hereinafter presented and described.

Details of a registration method of the first infrared thermal image $I_1$ and the second infrared thermal image $I_2$ by the registration unit 110 will be described.

The registration unit 110 performs registration based on the correlation (similarity) of the first infrared thermal image $I_1$ and the second infrared thermal image $I_2$. First, in one infrared thermal image (in the present example, the first infrared thermal image $I_1$) out of the first infrared thermal image $I_1$ and the second infrared thermal image $I_2$, a region of a predetermined size with a pixel A at any position as a center is set. For example, in a case where the first infrared thermal image $I_1$ has a size of 1024×768 pixels, the predetermined size can be, for example, 50×50 pixels.

Next, in the second infrared thermal image $I_2$, an operation to set a region of the same size as the region set in the first infrared thermal image $I_1$ and to evaluate the correlation (similarity) with the region set in the first infrared thermal image $I_1$ is repeated in a predetermined range around a pixel at the same position as the position set in the first infrared thermal image $I_1$ while sequentially changing a pixel to be a center. Because the first infrared thermal image $I_1$ and the second infrared thermal image $I_2$ are obtained by imaging the same object but are different in imaging position, one point on the object surface becomes different positions within a given range on the first infrared thermal image $I_1$ and the second infrared thermal image $I_2$. The given range can be the predetermined range for evaluating the correlation.

Then, a pixel B at the center of a region having the highest correlation (similarity) within the predetermined range is set as a pixel corresponding to the pixel A, and a value of the correlation (similarity) is stored in the memory 12. For all pixels of the first infrared thermal image $I_1$, corresponding pixels of the second infrared thermal image $I_2$ are obtained. Even in the region having the highest correlation (similarity), in a case where the correlation value is smaller than a predetermined value, it may be considered that there are no corresponding pixels (unclear). For example, in a case where values of 50×50 pixels are substantially the same (the temperature distribution is uniform), a maximum correlation value decreases.

Finally, after the corresponding pixels of the second infrared thermal image $I_2$ are obtained for all pixels of the first infrared thermal image $I_1$, only correspondence points (pixels) having the correlation (similarity) equal to or greater than the predetermined value are specified and extracted as a reference point in a descending order of the correlation (similarity). In the first infrared thermal image $I_1$ and the second infrared thermal image $I_2$, in a case where the reference point is set, it is preferable that a next reference point is set while excluding a region of a predetermined size with the reference point as a center, and each reference point is set such that the regions of the predetermined size with the respective reference points as a center do not overlap.

After the reference point is set in such a manner, the second infrared thermal image $I_2$ is geometrically corrected and subjected to registration such that the position of each reference point of the second infrared thermal image $I_2$ matches the position of the reference point of the first infrared thermal image $I_1$. With the extraction of only the correspondence points (pixels) having the correlation (similarity) equal to or greater than the predetermined value, only clear correspondence points, such as an end or a boundary of the object surface, are extracted as a reference point, and background reflection can be prevented from being extracted as a reference point.

As a method of performing registration based on the correlation (similarity) of two images, there are various known methods, and registration may be performed using any of these methods (note that, as described above, in a case where a place to be a reference is extracted, it is necessary to set a limit on the correlation (similarity) such that background reflection is not included in a place to be a reference of registration).

The registration unit 110 outputs the first infrared thermal image $I_1$ and a second infrared thermal image $I_{2-1}$ obtained by registering (geometrically correcting) the second infrared thermal image $I_2$ with respect to the first infrared thermal image $I_1$, to the first processing unit 120.

The first processing unit 120 executes processing (first processing) including at least one of discrimination processing, suppression processing, or enhancement processing of background reflection of infrared light from the periphery of the object on the infrared thermal image (in the present example, the first infrared thermal image $I_1$) obtained by imaging the object based on a difference between a temperature distribution of the first infrared thermal image $I_1$ and a temperature distribution of the second infrared thermal image $I_{2-1}$ subjected to registration. The infrared thermal image on which the first processing is executed is not limited to the first infrared thermal image $I_1$, and may be the second infrared thermal image $I_2$ or another infrared thermal image captured at the same imaging position where the first infrared thermal image $I_1$ or the second infrared thermal image $I_2$ is captured.

<Discrimination Processing of Background Reflection>

The first processing unit 120 can execute discrimination processing (processing of discriminating background reflection) of background reflection based on the difference between the temperature distribution of the first infrared thermal image $I_1$ and the temperature distribution of the second infrared thermal image $I_{2-1}$.

As shown in FIG. 2, in the first infrared thermal image $I_1$ and the second infrared thermal image $I_2$, the positions of the temperature distributions by infrared light emitted from the surface SS of the object, on the surface SS of the object are not changed. On the other hand, the positions of the temperature distributions by background reflection, on the surface SS of the object are different. Accordingly, background reflection can be discriminated by comparing the temperature distribution of the first infrared thermal image $I_1$ and the temperature distribution of the second infrared thermal image $I_{2-1}$ after registration. Specifically, first, a peculiar temperature distribution (a distribution that locally has cohesion and is different in temperature from the periphery) in the first infrared thermal image $I_1$ is extracted based on the first infrared thermal image $I_1$ and the second infrared thermal image $I_{2-1}$ after registration, the peculiar temperature distribution is compared with a temperature distribution in the second infrared thermal image $I_{2-1}$ at the same position as the peculiar temperature distribution, and discrimination can be made in such a manner that, in a case where both temperature distributions (the peculiar temperature distribution in the first infrared thermal image $I_1$ and the temperature distribution at the same position in the second infrared thermal image $I_{2-1}$) are the same or substantially the same, the temperature distribution is considered as the temperature distribution by infrared light emitted from the surface SS of the object, and in a case where both temperature distributions are different, the temperature distribution is considered as the temperature distribution by the background reflection.

The first processing unit 120 can also evaluate a difference between the positions of the temperature distribution of the first infrared thermal image $I_1$ and the temperature distribution of the second infrared thermal image $I_{2-1}$ after registration to discriminate background reflection. A specific description will be provided.

The first infrared thermal image $I_1$ is divided into square or rectangular regions of a predetermined size (small size). An operation to set a region of the same size in the second infrared thermal image $I_{2-1}$ in a predetermined range with a position of the region as a center regarding each divided region while sequentially changing the position and to evaluate the correlation (similarity) with the region in the first infrared thermal image $I_1$ is repeated, and a position of a region having the highest correlation (similarity), that is, a corresponding region, is obtained.

While most regions of the first infrared thermal image $I_1$ are regions of temperature distributions of the object surface, and have the highest correlation (similarity) with the regions at the same position of the second infrared thermal image $I_{2-1}$, some regions have the highest correlation (similarity) with regions at other positions of the second infrared thermal image $I_{2-1}$, and the regions correspond to background reflection.

Accordingly, a region for which the region in the first infrared thermal image $I_1$ is different (deviates) in position from the corresponding region in the second infrared thermal image $I_{2-1}$ may be determined (discriminated) as a region of background reflection and extracted. In a case where the position of the region (corresponding region) having the highest correlation (similarity) is obtained, and in a case where the correlation value is smaller than a predetermined value, it may be considered that the reliability of derivation of the position is low, and the position may be excluded from the discrimination of background reflection.

After the discrimination of background reflection is performed regarding each divided region, in a case where there is a region (background reflection region) of background reflection adjacent to each background reflection region, the background reflection regions are considered as the same background reflection region and are connected. That is, respective adjacent background reflection regions are collected as one background reflection region.

Finally, a rectangular region that includes each background reflection region collected as one region is set as a background reflection region, and a position of a region (corresponding region) in the second infrared thermal image $I_{2\text{-}1}$ having the highest correlation (similarity) is obtained regarding the finally obtained rectangular background reflection region of the first infrared thermal image $I_1$.

The above-described discrimination processing of the background reflection will be more specifically described with reference to FIGS. 4A to 4D.

Figure 4A:
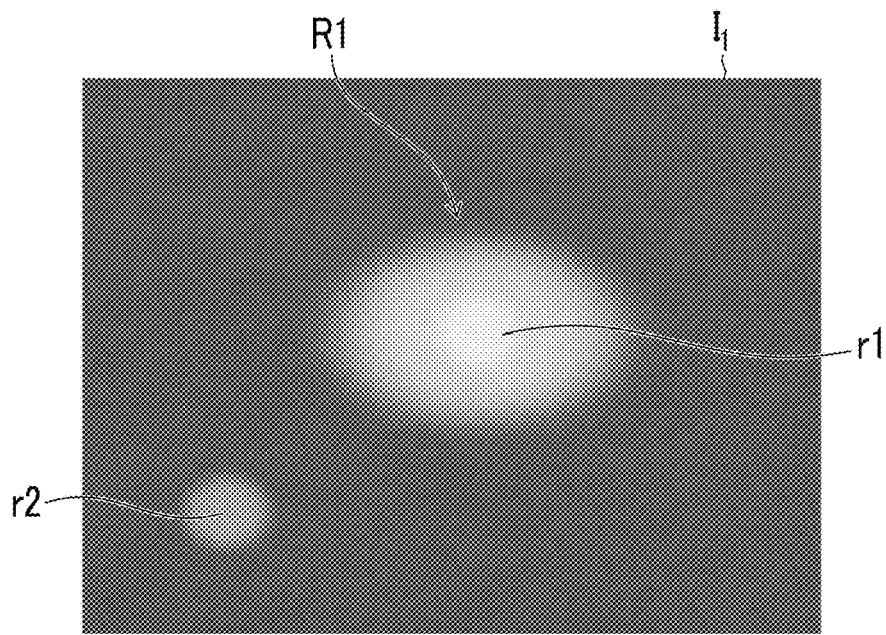
FIG. 4A is a diagram schematically showing a first infrared thermal image.
Figure 4B:
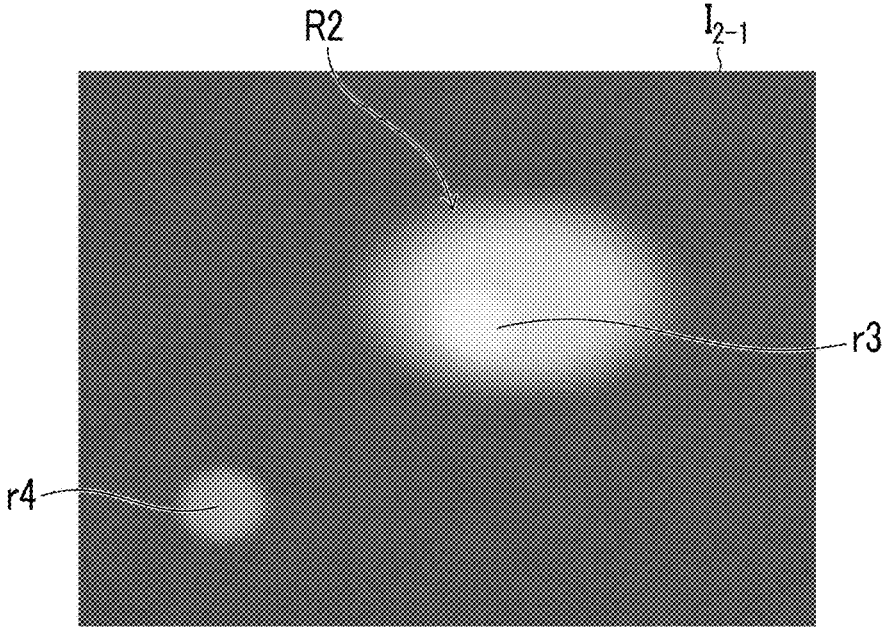
FIG. 4B is a diagram schematically showing a second infrared thermal image.

FIGS. 4A and 4B are diagrams schematically showing a first infrared thermal image and a second infrared thermal image, respectively, and show infrared thermal images after registration.

The first infrared thermal image $I_1$ shown in FIG. 4A has, for example, an image size of 1024×768 pixels, and in the first infrared thermal image $I_1$, a temperature distribution by infrared light emitted from the object surface is shown in the entire range of the image, a small circular peculiar temperature distribution r2 is shown on a lower left side of the image, and a large elliptical peculiar temperature distribution R1 is shown at the center. Here, a peculiar temperature distribution indicates a distribution that locally has cohesion and is different in temperature from the periphery.

In the first infrared thermal image $I_1$ shown in FIG. 4A, another small circular peculiar temperature distribution r1 overlaps at the center of the peculiar temperature distribution R1 at the center.

The second infrared thermal image $I_{2\text{-}1}$ shown in FIG. 4B has the same image size as the first infrared thermal image $I_1$, and in the second infrared thermal image $I_{2\text{-}1}$, a temperature distribution by infrared light emitted from the object surface is shown in the entire range of the image, a small circular peculiar temperature distribution r4 is shown on a lower left side of the image, and a large elliptical peculiar temperature distribution R2 is also shown on an upper right side slightly from the center. In the second infrared thermal image $I_{2\text{-}1}$ shown in FIG. 4B, a small circular peculiar temperature distribution r3 is at the center of the image and overlaps a lower left portion of the peculiar temperature distribution R2.

Here, the small circular peculiar temperature distribution r1 shown at the center of the first infrared thermal image $I_1$ of FIG. 4A and the small circular peculiar temperature distribution r3 shown at the center of the second infrared thermal image $I_{2\text{-}1}$ of FIG. 4B show the same temperature distribution by infrared light emitted from the object surface, are at the same positions on both images, and have similar temperature distributions. Similarly, the small circular peculiar temperature distribution r2 shown on the lower left side of the first infrared thermal image $I_1$ of FIG. 4A and the small circular peculiar temperature distribution r4 shown on the lower left side of the second infrared thermal image $I_{2\text{-}1}$ of FIG. 4B show the same temperature distribution by infrared light emitted from the object surface, are at the same positions on both images, and have similar temperature distributions.

On the other hand, the large elliptical peculiar temperature distribution R1 shown in the first infrared thermal image $I_1$ and the large elliptical peculiar temperature distribution R2 shown in the second infrared thermal image $I_{2\text{-}1}$ show temperature distribution by background reflection of infrared light from the periphery of the object, and have similar temperature distributions, respectively, but deviate in position on both images. The background reflection R2 of the second infrared thermal image $I_{2\text{-}1}$ slightly deviates to the upper right side with respect to the background reflection R1 of the first infrared thermal image $I_1$.

In FIGS. 4A and 4B, the peculiar temperature distributions r1 to r4 on the object surface and the temperature distributions R1 and R2 by the background reflection have a high temperature compared to the periphery, but may have a low temperature. For example, in a case where the first infrared thermal image $I_1$ (and the second infrared thermal image $I_2$) is an infrared thermal image obtained by imaging a concrete structure at night, a temperature of a structure surface in a defective part, such as "floating" included in the structure, is low compared to the temperature of the surface in a surrounding sound part. As described in "Considerations in infrared camera imaging with different detection wavelength ranges" 65th Japan Society of Civil Engineers (JSCE) Annual Meeting (September 2010), in a case where the first infrared thermal image $I_1$ (and the second infrared thermal image $I_2$) is an infrared thermal image obtained by imaging a concrete structure at night, reflection of infrared light from the sky in a structure surface appears as a temperature distribution at a low temperature compared to the periphery.

Figure 4C:
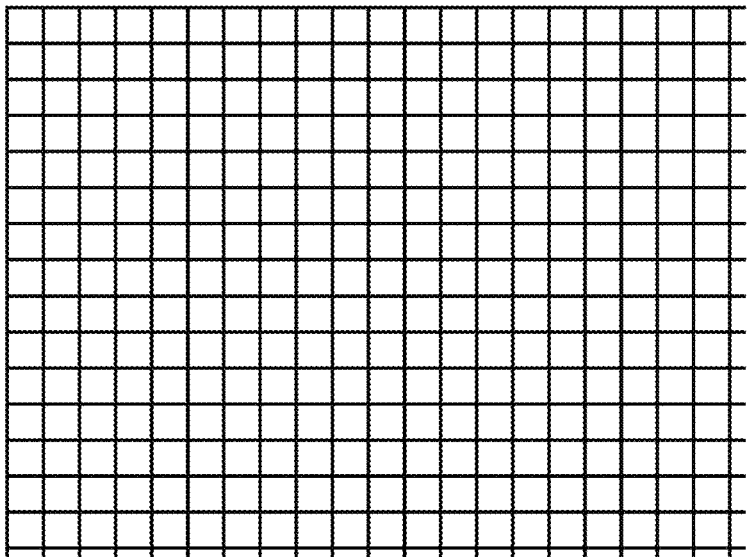
FIG. 4C is a diagram showing respective divided regions in a case where the first infrared thermal image shown in FIG. 4A is divided into regions of a predetermined size.

FIG. 4C is a diagram showing respective divided regions in a case where the first infrared thermal image of FIG. 4A is divided into regions of a predetermined size. In the present example, the first infrared thermal image $I_1$ of 1024×768 pixels is divided into square regions of 50×50 pixels.

Figure 4D:
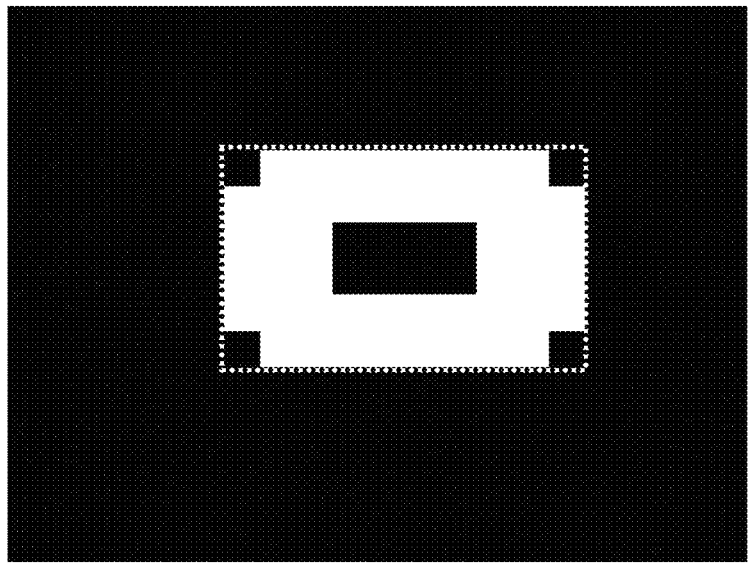
FIG. 4D is a diagram showing divided regions discriminated as a background reflection region among the respective divided regions in the first infrared thermal image of FIG. 4A.

FIG. 4D is a diagram showing divided regions discriminated as background reflection regions among the respective divided regions in the first infrared thermal image of FIG. 4A.

A position of a region (corresponding region) in the second infrared thermal image $I_{2\text{-}1}$ having the highest correlation (similarity) with each region of 50×50 pixels shown in FIG. 4C in the first infrared thermal image $I_1$ is obtained, and only a region for which the position in the first infrared thermal image $I_1$ and the position in the second infrared thermal image $I_{2\text{-}1}$ are different (deviate) is discriminated as background reflection. Here, the presence or absence of the difference (deviation) in position is determined depending on whether or not the difference (deviation) in position is equal to or greater than a predetermined degree (in a case where the difference (deviation) in position is equal to or greater than the predetermined degree, determination is made that there is the difference (deviation) in position).

FIG. 4D is a diagram showing a discrimination result, and shows regions discriminated as background reflection in white. In a case where the position of the corresponding region is obtained, and in a case where the correlation value is smaller than a predetermined value (for example, in a case where the correlation value is smaller than 0.9), it is considered that the reliability of derivation of the position is low, and the position is excluded from the discrimination of background reflection.

That is, FIG. 4D shows that, as a result of obtaining the correlation value of each region of 50×50 pixels of the first infrared thermal image $I_1$ with the position of the region in the second infrared thermal image $I_{2\text{-}1}$ having the highest correlation, only regions which have the correlation value equal to or greater than the predetermined value (equal to or greater than 0.9) and for which the position of the region in the first infrared thermal image $I_1$ and the position of the corresponding region in the second infrared thermal image $I_{2\text{-}1}$ are different (deviate) are shown in white.

In FIG. 4D, a finally obtained rectangular background reflection region of the first infrared thermal image $I_1$ is shown by a white dotted line.

In comparison of the temperature distribution of the first infrared thermal image $I_1$ of FIG. 4A and the background reflection discrimination result of FIG. 4D, it is understood that the whole temperature distribution R1 (the large ellipse at the center) of the background reflection in the first infrared thermal image $I_1$ of FIG. 4A is not discriminated as background reflection in FIG. 4D.

That is, in FIG. 4D, a region around the center is not discriminated as background reflection. The reason is that around the center of the background reflection R1 of the first infrared thermal image $I_1$, the temperature distribution is substantially even, and it is difficult to obtain the position of the corresponding region of the second infrared thermal image $I_{2-1}$ (the correlation value is smaller than the predetermined value).

In the example of FIG. 4A, although the temperature distribution r1 of the object surface overlaps at the center of the background reflection R1, this is not the reason. That is, in the example of FIG. 4A, even in a case where the temperature distribution r1 of the object surface does not overlap at the center of the background reflection R1, a region around the center of the background reflection R1 is not discriminated as background reflection. In this way, in a case where the temperature distribution of the background reflection of the first infrared thermal image $I_1$ includes a partially nearly even temperature distribution, it may be difficult to obtain a position of a region of the second infrared thermal image $I_{2-1}$ corresponding to a region of that portion.

Note that a region around the boundary of the background reflection of the first infrared thermal image $I_1$ is discriminated as background reflection as shown in FIG. 4D because the temperature distribution of the region has a large change in temperature. Accordingly, the rectangular region that includes the regions discriminated as background reflection is set as the final background reflection region, so that, even in a case where the temperature distribution of the background reflection of the first infrared thermal image $I_1$ includes a temperature distribution where it is difficult to obtain the position of the corresponding region of the second infrared thermal image $I_{2-1}$, it is possible to correctly extract the background reflection (a region within the white dotted line of FIG. 4D) of the first infrared thermal image $I_1$.

The discrimination processing of the background reflection based on the difference between the positions of the temperature distribution of the first infrared thermal image $I_1$ and the temperature distribution of the second infrared thermal image $I_{2-1}$ after registration is not limited to the above-described example, and various kinds of discrimination processing are considered as described below.

First, in the first infrared thermal image $I_1$, a peculiar temperature distribution (a distribution that locally has cohesion and is different in temperature from the periphery) is obtained. Specifically, in the first infrared thermal image $I_1$, a threshold value of a temperature is set, and a temperature distribution equal to or higher than the threshold value (for daytime imaging) or equal to or lower than the threshold value (for night imaging) may be obtained as a peculiar temperature distribution.

For example, in the first infrared thermal image $I_1$, in a case where there is a region that is known as a region having no defective part, such as "floating", and no background reflection, an average temperature of a temperature distribution of the region may be obtained, and the average temperature+a predetermined temperature (for daytime imaging) or the average temperature—the predetermined temperature (for night imaging) may be set as a threshold value for obtaining a peculiar temperature distribution.

In the first infrared thermal image $I_1$, in a case where a region with no defective part, such as "floating", and no background reflection is not known, in the first infrared thermal image $I_1$, an average temperature of a temperature distribution in a wider range than the defective part, such as "floating", and background reflection may be obtained, and the average temperature+a predetermined temperature or the average temperature—the predetermined temperature may be set as a threshold value for obtaining a peculiar temperature distribution. In this case, an average temperature of a temperature distribution in a predetermined range wider than a defective part and background reflection around each pixel of the first infrared thermal image $I_1$ may be obtained, and the average temperature+a predetermined temperature or the average temperature—the predetermined temperature may be set as a threshold value.

Figure 5:
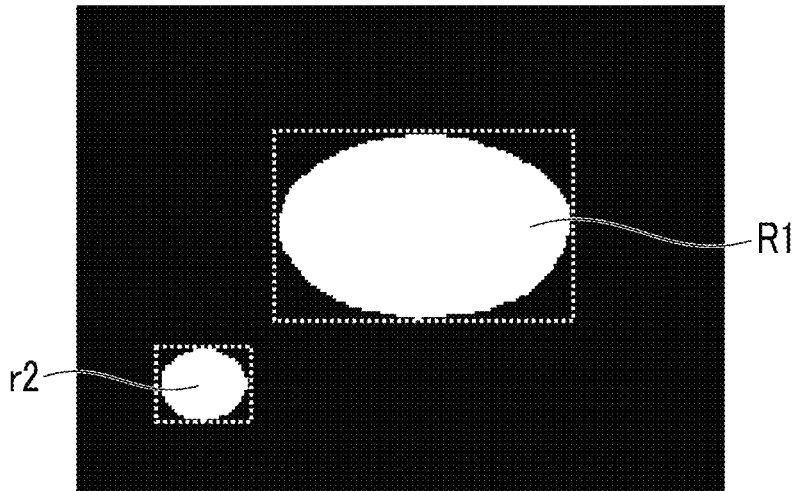
FIG. 5 is a diagram showing a result of obtaining a peculiar temperature distribution through threshold value processing regarding the first infrared thermal image of FIG. 4A.

FIG. 5 is a diagram showing a result of obtaining a peculiar temperature distribution through threshold value processing regarding the first infrared thermal image of FIG. 4A.

That is, FIG. 5 shows a result of obtaining an average temperature of a temperature distribution of the whole first infrared thermal image $I_1$ of FIG. 4A, setting the average temperature as a threshold value, and obtaining a temperature distribution equal to or higher than the threshold value as a peculiar temperature distribution.

In FIG. 5, a rectangular region including each obtained peculiar temperature distribution is shown by a white dotted line. It is understood that a temperature distribution r2 of the object surface on the lower left side and a background reflection R1 at the center are obtained as a peculiar temperature distribution.

In this case, in a case where the peculiar temperature distributions are first obtained in the first infrared thermal image $I_1$, next, a position and a correlation value of a region (corresponding region) in the second infrared thermal image $I_{2-1}$ having the highest correlation (similarity) are obtained regarding each peculiar temperature distribution (the temperature distribution of the rectangular region), and regions which have the correlation values equal to or greater than the predetermined value and for which the position of the peculiar temperature distribution in the first infrared thermal image $I_1$ and the position of the corresponding region in the second infrared thermal image $I_{2-1}$ are different (deviate) may be determined (discriminated) as background reflection and extracted. Here, as described above, the presence or absence of the difference (deviation) in position may be determined depending on whether or not the difference (deviation) in position is equal to or greater than a predetermined degree (in a case where the difference (deviation) in position is equal to or greater than the predetermined degree, determination may be made that there is the difference (deviation) in position). In this way, by the method that first obtains the peculiar temperature distributions in the first infrared thermal image $I_1$, and next, obtains the position of the corresponding region of the second infrared thermal image $I_{2-1}$ regarding each peculiar temperature distribution to discriminate background reflection, the region of background reflection can be more accurately extracted, compared to the above-described method that first divides the first infrared thermal image $I_1$ into regions of a small size, then obtains the position of the corresponding region of the second infrared thermal image $I_{2-1}$ for each region of a small size to discriminate background reflection, and next, connects adjacent background reflection regions to form one background reflection region.

As the discrimination processing of background reflection using the first infrared thermal image $I_1$ and the second infrared thermal image $I_{2-1}$ after registration, various machine learning methods can also be used.

Specifically, the region of background reflection may be discriminated with two infrared thermal images (first infrared thermal image $I_1$ and second infrared thermal image $I_{2-1}$) after registration as input by a machine learning method for object detection (a machine learning method that detects an object from an image along with a position (a rectangle (bounding box) including the object) of the object; a region-based convolutional neural network (R-CNN), spatial pyramid pooling (SPP-net), fast R-CNN, faster R-CNN, you only look once (YOLO), a single shot detector (SSD), mask R-CNN, YOLOv3, or the like) or by a machine learning method for image segmentation (a machine learning method for category classification for each pixel of an image; fully convolutional networks (FCN), SegNet, U-Net, a pyramid scene parsing network (PSPNet), deep lab (v1 to v3+), fast FCN, or the like).

<Suppression Processing of Background Reflection>

The first processing unit 120 can execute suppression processing (processing of suppressing background reflection) of background reflection based on a result of the discrimination processing of background reflection described above.

To execute the suppression processing of background reflection, first, it is necessary to separate the temperature distribution by background reflection and the temperature distribution of the object surface.

As shown in FIG. 2, in a case where the temperature distribution R1 by background reflection in the first infrared thermal image $I_1$ and the temperature distribution R2 by corresponding background reflection in the second infrared thermal image $I_2$ do not overlap on the surface SS of the object, naturally, the temperature distribution R1 by background reflection in the first infrared thermal image $I_1$ and the temperature distribution R2 by corresponding background reflection in the second infrared thermal image $I_{2-1}$ after registration are not superimposed. In this case, in the region (the region shown by the white dotted line in FIG. 4D or 5) of background reflection of the first infrared thermal image $I_1$ after registration, the temperature distribution R1 by the background reflection can be extracted (separated) by subtracting the temperature distribution of the second infrared thermal image $I_{2-1}$ from the temperature distribution of the first infrared thermal image $I_1$.

On the other hand, in a case where the imaging positions P1 and P2 of the infrared cameras 20 and 22 are close, in a case where the temperature distribution R1 by background reflection in the first infrared thermal image $I_1$ and the temperature distribution R2 by background reflection in the second infrared thermal image $I_2$ are large, or the like, some regions of the temperature distribution R1 by background reflection in the first infrared thermal image $I_1$ and the temperature distribution R2 by background reflection in the second infrared thermal image $I_2$ overlap each other.

In the first infrared thermal image $I_1$ and the second infrared thermal image $I_{2-1}$ after registration shown in FIGS. 4A and 4B, some regions of the temperature distribution R1 by background reflection of the first infrared thermal image $I_1$ and the temperature distribution R2 by corresponding background reflection of the second infrared thermal image $I_{2-1}$ overlap each other.

In this way, even in a case where some regions of the temperature distributions R1 and R2 by background reflection overlap each other, it is possible to separate the temperature distribution by background reflection and the temperature distribution of the object surface. A separation method will be specifically described below.

Figure 6A:
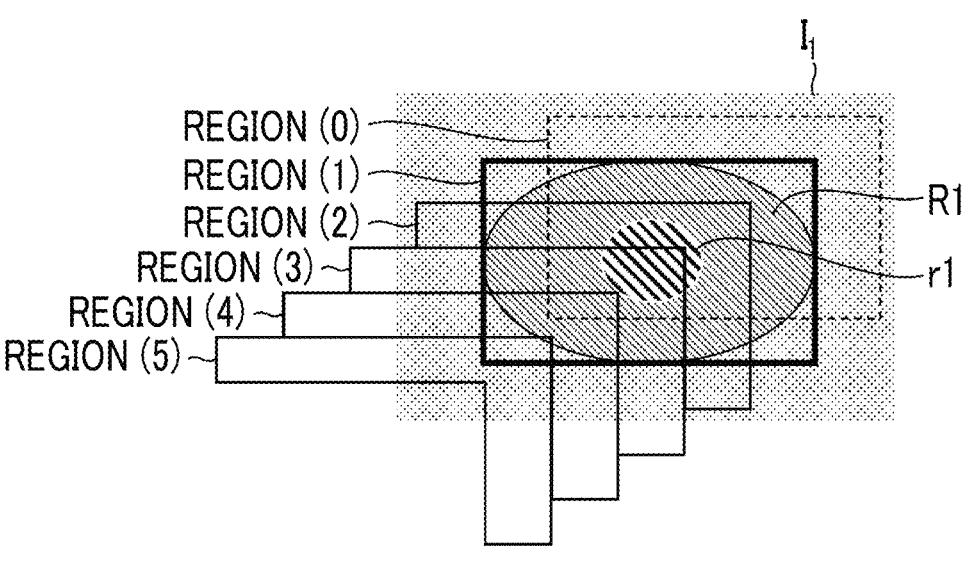
FIG. 6A is a schematic view extracting only the vicinity of background reflection in the first infrared thermal image shown in FIG. 4A and clearly showing background reflection and a temperature distribution of an object surface overlapping background reflection, and is a diagram showing setting of a region (0) to a region (5) in the first infrared thermal image.

FIG. 6A is a schematic view extracting only the vicinity of background reflection in the first infrared thermal image shown in FIG. 4A and clearly showing background reflection and a temperature distribution of an object surface overlapping background reflection, and is a diagram showing setting of a region (0) to a region (5) in the first infrared thermal image.

Figure 6B:
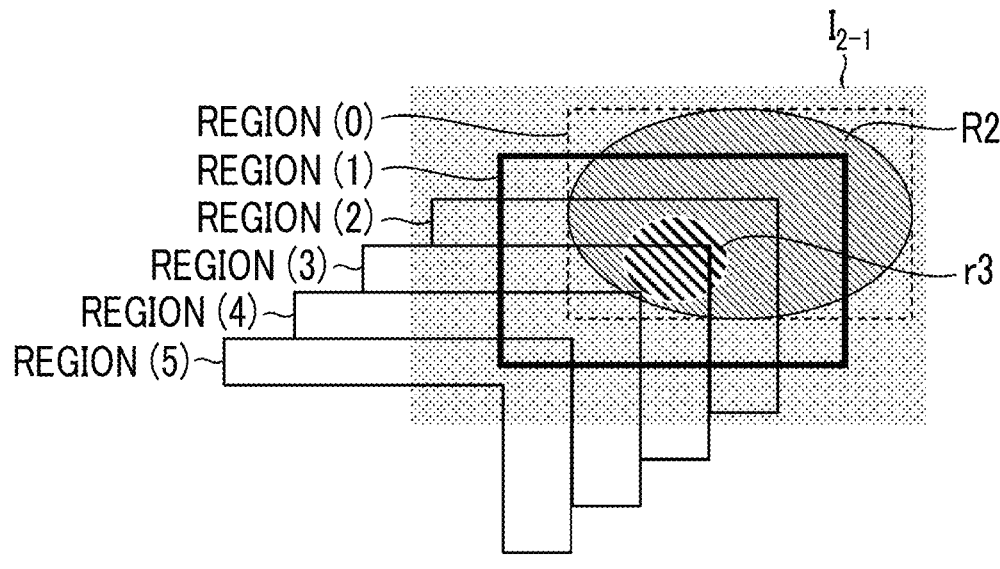
FIG. 6B is a schematic view extracting only the vicinity of background reflection in the second infrared thermal image shown in FIG. 4B and clearly showing background reflection and a temperature distribution of an object surface overlapping background reflection, and is a diagram showing setting of a region (0) to a region (5) in the second infrared thermal image.

FIG. 6B is a schematic view extracting only the vicinity of background reflection in the second infrared thermal image shown in FIG. 4B and clearly showing background reflection and a temperature distribution of an object surface overlapping background reflection, and is a diagram showing setting of a region (0) to a region (5) in the second infrared thermal image.

In FIG. 6A, the temperature distribution R1 of background reflection in the first infrared thermal image $I_1$ is schematically shown as a dark grey large elliptical region, and the temperature distribution r1 of the object surface overlapping the temperature distribution R1 is schematically shown as a hatched small circular region. In FIG. 6B, the temperature distribution R2 of background reflection in the second infrared thermal image $I_{2-1}$ is schematically shown as a dark grey large elliptical region, and the temperature distribution r3 of the object surface overlapping the temperature distribution R2 is schematically shown as a hatched small circular region. In FIGS. 6A and 6B, a background reflection region (a rectangular region including the temperature distribution R1 of background reflection) in the first infrared thermal image $I_1$ is shown to be surrounded by a thick solid line frame, and a corresponding background reflection region (a rectangular region including the temperature distribution R2 of background reflection) in the second infrared thermal image $I_{2-1}$ is shown to be surrounded by a thin dotted line frame.

In FIGS. 6A and 6B, each of the region (0) to the region (5) is set. The region (0) is a differential region of the thick solid line frame and the thin dotted line frame, that is, a differential region of the background reflection region in the first infrared thermal image $I_1$ and the corresponding background reflection region in the second infrared thermal image $I_{2-1}$, and is a differential region on the upper right side in FIGS. 6A and 6B. The region (1) is a region obtained by shifting the region (0) to the lower left side, and some sides of the region (1) match the sides of the thick solid line frame.

The region (2) is a region obtained by shifting the region (1) to the lower left side and is a region shifted by the same amount as the amount of shift from the region (0) to the region (1). Hereinafter, similarly, each of the regions (3) to (5) is set in FIGS. 6A and 6B. Here, the whole region (the background reflection region in the first infrared thermal image $I_1$) surrounded by the thick solid line frame is included in the regions (1) to (5). In this way, each region after the region (1) is set until the entire background reflection region in the first infrared thermal image $I_1$ is included.

Separation of Background Reflection in the Region (1) of the First Infrared Thermal Image $I_1$ and the Temperature Distribution of the Object Surface First, in the region (0), there is no background reflection in FIG. 6A (first infrared thermal image $I_1$), and there is background reflection only in FIG. 6B (second infrared thermal image $I_{2-1}$). Accordingly, background reflection in the region (0) of the second infrared thermal image $I_{2-1}$ can be obtained by subtracting the region (0) of the first infrared thermal image $I_1$ from the region (0) of the second infrared thermal image $I_{2-1}$.

Here, the background reflection in the region (0) in the second infrared thermal image $I_{2-1}$ corresponds to background reflection in the region (1) of the first infrared thermal image $I_1$. Accordingly, the background reflection in the region (0) of the second infrared thermal image $I_{2-1}$ is obtained, so that the background reflection in the region (1) of the first infrared thermal image $I_1$ can be obtained simultaneously.

Next, the temperature distribution of the object surface in the region (1) of the first infrared thermal image $I_1$ can be obtained by subtracting the background reflection in the region (1) of the first infrared thermal image $I_1$ from the region (1) of the first infrared thermal image $I_1$.

Separation of Background Reflection in the Region (2) of the First Infrared Thermal Image $I_1$ and the Temperature Distribution of the Object Surface First, background reflection in the region (1) of the second infrared thermal image $I_{2-1}$ can be obtained by subtracting the temperature distribution of the object surface in the region (1) of the first infrared thermal image $I_1$ from the region (1) of the second infrared thermal image $I_{2-1}$.

Here, the background reflection in the region (1) of the second infrared thermal image $I_{2-1}$ corresponds to background reflection in the region (2) of the first infrared thermal image $I_1$. Accordingly, the background reflection in the region (1) of the second infrared thermal image $I_{2-1}$ is obtained, so that the background reflection in the region (2) of the first infrared thermal image $I_1$ can be obtained simultaneously.

Next, the temperature distribution of the object surface in the region (2) of the first infrared thermal image $I_1$ can be obtained by subtracting the background reflection in the region (2) of the first infrared thermal image $I_1$ from the region (2) of the first infrared thermal image $I_1$.

Hereinafter, the same procedure as described above is repeated, background reflection in the region (3) of the first infrared thermal image $I_1 \rightarrow$ the temperature distribution of the object surface in the region (3) of the first infrared thermal image $I_1 \rightarrow$ background reflection in the region (4) of the first infrared thermal image $I_1 \rightarrow$ the temperature distribution of the object surface in the region (4) of the first infrared thermal image $I_1 \rightarrow$ background reflection in the region (5) of the first infrared thermal image $I_1 \rightarrow$ the temperature distribution of the object surface in the region (5) of the first infrared thermal image $I_1$ can be obtained in this order.

Figure 6C:
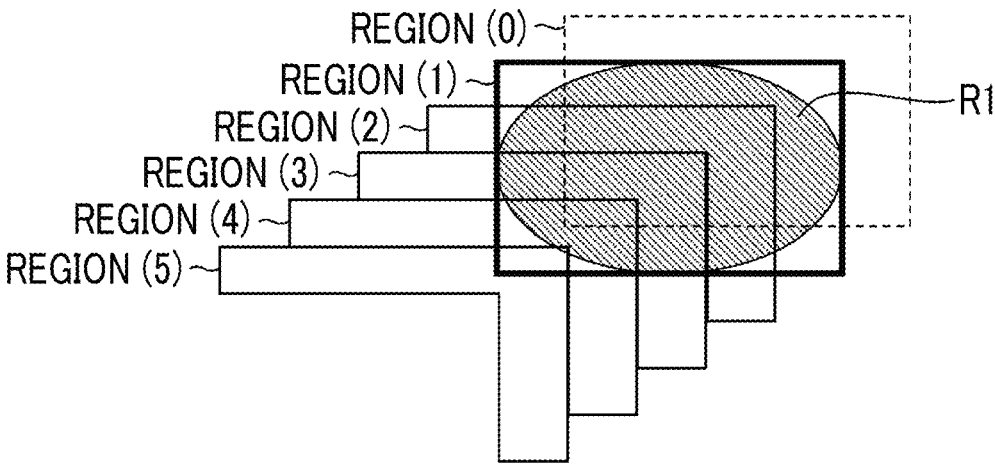
FIG. 6C is a diagram showing a temperature distribution by background reflection in the first infrared thermal image.
Figure 6D:
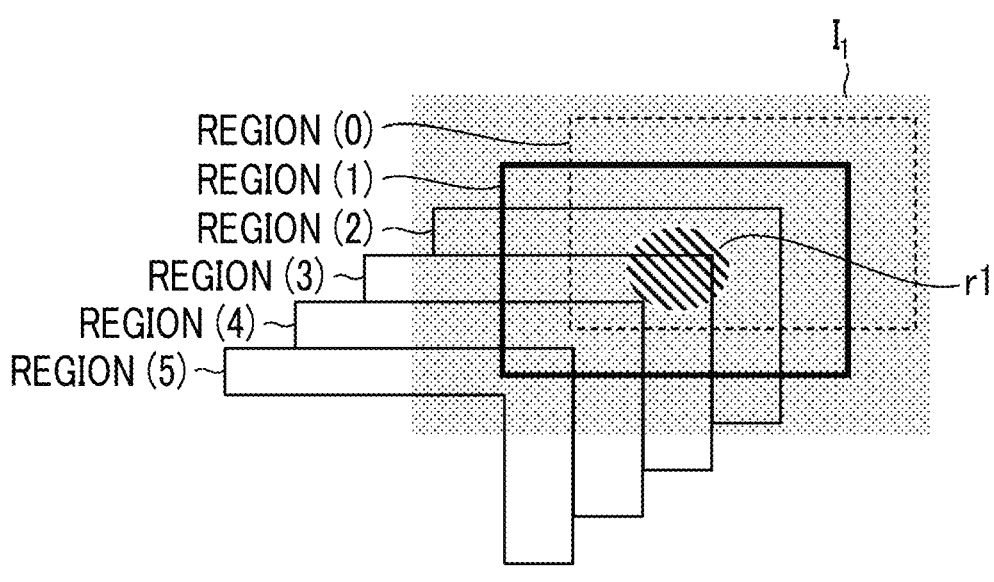
FIG. 6D is a diagram showing a temperature distribution of the object surface in the first infrared thermal image.

With the above-described procedure, as shown in FIGS. 6C and 6D, it is possible to separate the temperature distribution by background reflection and the temperature distribution of the object surface in the first infrared thermal image $I_1$.

FIG. 6C shows the temperature distribution by background reflection in the first infrared thermal image $I_1$, and FIG. 6D shows the temperature distribution of the object surface in the first infrared thermal image $I_1$.

It is also possible to simultaneously separate the temperature distribution by background reflection and the temperature distribution of the object surface in the second infrared thermal image $I_{2-1}$ (background reflection in the second infrared thermal image $I_{2-1}$ is a distribution that deviates from background reflection in the first infrared thermal image $I_1$ by an amount of the region (0), and the temperature distribution of the object surface in the second infrared thermal image $I_{2-1}$ is the same as the temperature distribution of the object surface in the first infrared thermal image $I_1$).

Figure 7A:
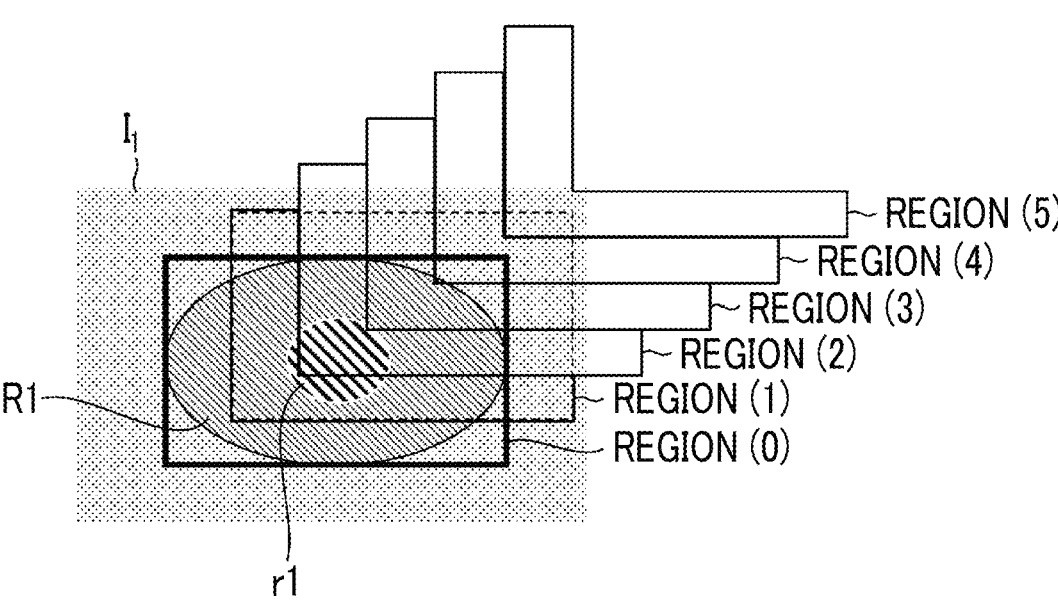
FIG. 7A is a schematic view extracting only the vicinity of background reflection in the first infrared thermal image shown in FIG. 4A and clearly showing background reflection and a temperature distribution of an object surface overlapping background reflection, and is a diagram showing setting of a region (0) to a region (5) different from FIG. 6A.

FIG. 7A is a schematic view extracting only the vicinity of background reflection in the first infrared thermal image shown in FIG. 4A and clearly showing background reflection and a temperature distribution of an object surface overlapping background reflection, and is a diagram showing setting of a region (0) to a region (5) different from FIG. 6A.

Figure 7B:
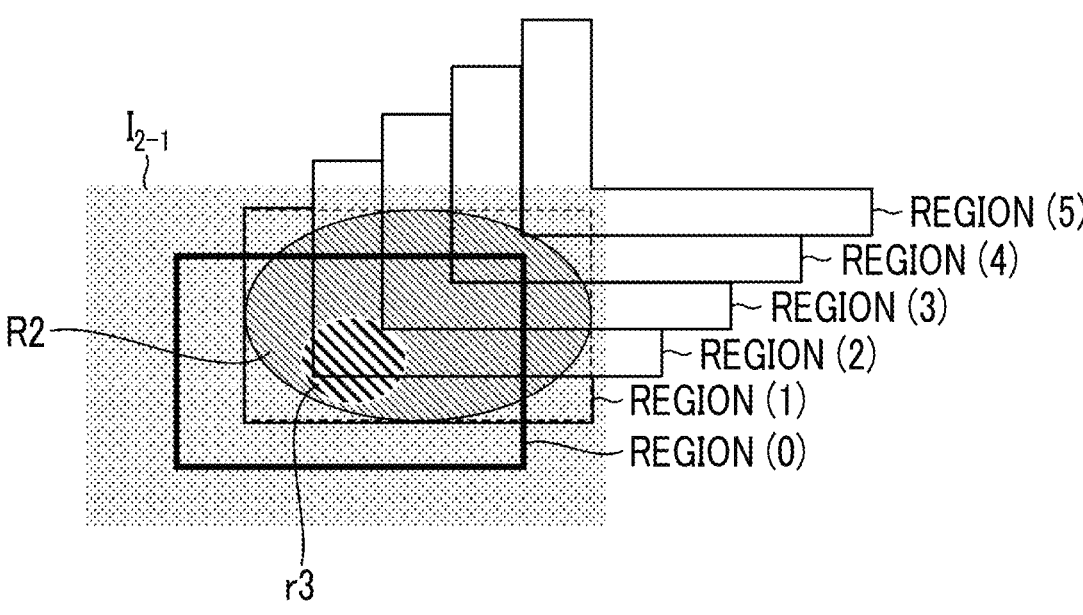
FIG. 7B is a schematic view extracting only the vicinity of background reflection in the second infrared thermal image shown in FIG. 4B and clearly showing background reflection and a temperature distribution of an object surface overlapping background reflection, and is a diagram showing setting of a region (0) to a region (5) different from FIG. 6B.

FIG. 7B is a schematic view extracting only the vicinity of background reflection in the second infrared thermal image shown in FIG. 4B and clearly showing background reflection and a temperature distribution of an object surface overlapping background reflection, and is a diagram showing setting of a region (0) to a region (5) different from FIG. 6B.

In the above description, as shown in FIGS. 6A and 6B, although a procedure of setting a region where there is no background reflection in the first infrared thermal image $I_1$ and there is background reflection only in the second infrared thermal image $I_{2-1}$, as the region (0), and separating the background reflection and the temperature distribution of the object surface in an order of the region (0)$\rightarrow$the region (1)$\rightarrow$the region (2) . . . has been described, as shown in FIGS. 7A and 7B, in the first infrared thermal image $I_1$ and the second infrared thermal image $I_{2-1}$, each of the region (0) to the region (5) may be set, and the background reflection and the temperature distribution of the object surface may be separated.

That is, as shown in FIGS. 7A and 7B, a region where there is no background reflection in the second infrared thermal image $I_{2-1}$ and there is background reflection only in the first infrared thermal image $I_1$ may be set as the region (0), and the background reflection and the temperature distribution of the object surface may be separated in an order of the region (0)$\rightarrow$the region (1)$\rightarrow$the region (2) . . .

.

Because the procedure of separating the background reflection and the temperature distribution of the object surface in the order of the region (0)$\rightarrow$the region (1)$\rightarrow$the region (2) . . . shown in FIGS. 7A and 7B is the same as the procedure of separating the background reflection and the temperature distribution of the object surface in the order of the region (0)$\rightarrow$the region (1)$\rightarrow$the region (2) . . . shown in FIGS. 6A and 6B, detailed description of the procedure of separation will not be repeated. The background reflection and the temperature distribution of the object surface may be separated in the order of the region (0)$\rightarrow$the region (1)$\rightarrow$the region (2) . . . shown in FIGS. 6A and 6B, the background reflection and the temperature distribution of the object surface may be separated in the order of the region (0)$\rightarrow$the region (1)$\rightarrow$the region (2) . . . shown in FIGS. 7A and 7B, and the background reflection and the temperature distributions of the object surface separated in the respective orders may be averaged.

It is not always true that the temperature distributions of the background reflection are the same in two infrared thermal images. Specifically, in a case where background reflection is at an edge of the first infrared thermal image and/or the second infrared thermal image, in a case where background reflection is at an edge of the object surface smoothly connected in the first infrared thermal image and/or the second infrared thermal image, or the like, the temperature distribution of the background reflection may be different in the first infrared thermal image and the second infrared thermal image. In a case where the temperature distributions of the background reflection are not wholly the same but are partially the same in the first infrared thermal image and the second infrared thermal image, it is possible to separate the background reflection and the temperature distribution of the object surface. Specifically, in a case where background reflection (background reflection of an image with less background reflection) of any of the first infrared thermal image and the second infrared thermal image is included in background reflection of the other image, separation can be performed by the same method.

Figure 8A:
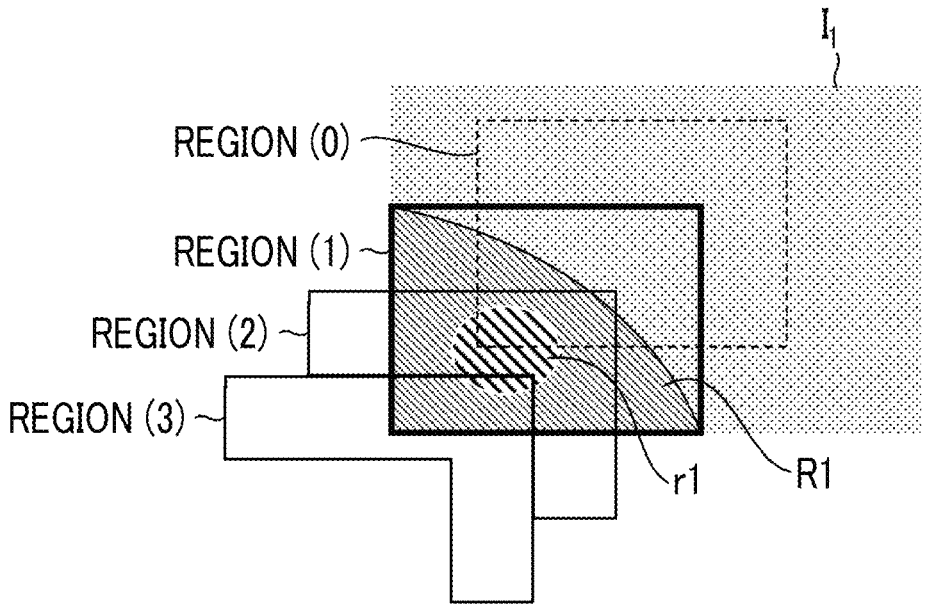
FIG. 8A is a schematic view clearly showing background reflection and a temperature distribution of an object surface regarding an example of a first infrared thermal image having a temperature distribution of background reflection different from the first infrared thermal image shown in FIG. 4A, and is a diagram showing setting a region (0) to a region (3) in the first infrared thermal image.

FIG. 8A is a schematic view clearly showing background reflection and a temperature distribution of an object surface regarding an example of a first infrared thermal image having a temperature distribution of background reflection different from the first infrared thermal image shown in FIG. 4A, and is a diagram showing setting a region (0) to a region (3) in the first infrared thermal image.

Figure 8B:
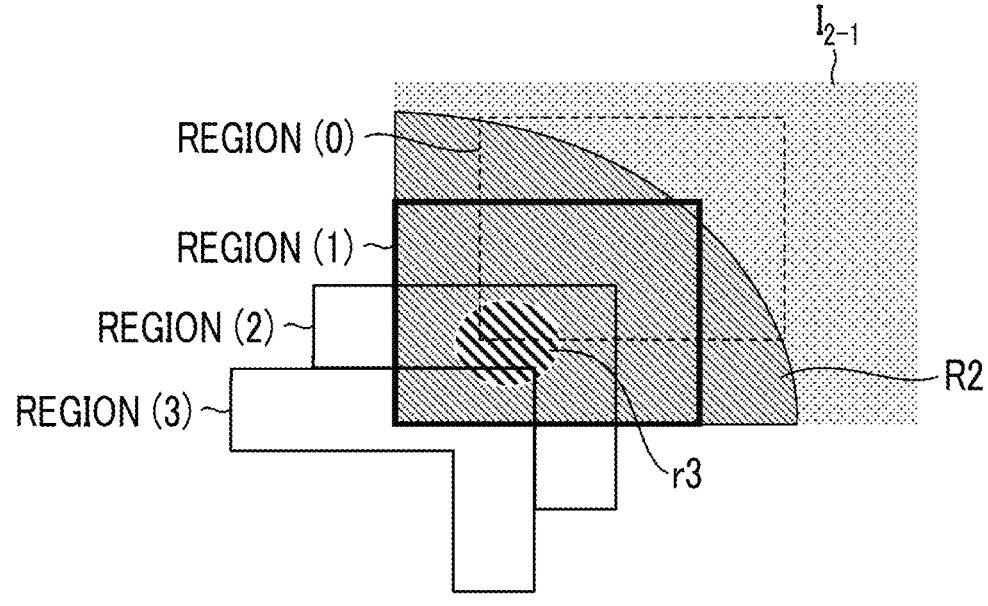
FIG. 8B is a schematic view clearly showing background reflection and a temperature distribution of an object surface regarding an example of a second infrared thermal image having a temperature distribution of background reflection different from the second infrared thermal image shown in FIG. 4B, and is a diagram showing setting a region (0) to a region (3) in the second infrared thermal image.

FIG. 8B is a schematic view clearly showing background reflection and a temperature distribution of an object surface regarding an example of a second infrared thermal image having a temperature distribution of background reflection different from the second infrared thermal image shown in FIG. 4B, and is a diagram showing setting a region (0) to a region (3) in the second infrared thermal image.

In FIG. 8A, the temperature distribution R1 of the background reflection in the first infrared thermal image $I_1$ is schematically shown as a dark grey region, and the temperature distribution r1 of the object surface overlapping the temperature distribution R1 is schematically shown as a hatched small circular region. In FIG. 8B, the temperature distribution R2 of the background reflection in the second infrared thermal image $I_{2-1}$ is schematically shown as a dark grey region, and the temperature distribution r3 of the object surface overlapping the temperature distribution R2 is schematically shown as a hatched small circular region. In FIGS. 8A and 8B, a background reflection region (a rectangular region including the temperature distribution R1 of the background reflection) in the first infrared thermal image $I_1$ is shown to be surrounded by a thick solid line frame, and a corresponding background reflection region in the second infrared thermal image $I_{2-1}$ is shown to be surrounded by a thin dotted line frame.

In the example shown in FIGS. 8A and 8B, the background reflection R1 in the first infrared thermal image $I_1$ is included in the background reflection R2 in the second infrared thermal image $I_{2-1}$. In this case, through the discrimination processing of the background reflection described above, the background reflection region (the region that includes the temperature distribution R1 of the background reflection and is surrounded by the thick solid line frame) in the first infrared thermal image $I_1$ and the corresponding background reflection region (the region surrounded by the thin dotted line frame) in the second infrared thermal image $I_{2-1}$ are determined (discriminated) as a region of background reflection based on the correlation (similarity) and extracted. Here, the region (the region surrounded by the thin dotted line frame) that is determined as the corresponding background reflection region in the second infrared thermal image $I_{2-1}$ is a region that includes a partial temperature distribution having the highest correlation (similarity) with the temperature distribution R1 of the background reflection in the first infrared thermal image $I_1$, not a region that includes the whole temperature distribution R2 of the background reflection in the second infrared thermal image $I_{2-1}$, and is a region of the same size as the background reflection region (the region surrounded by the thick solid line frame) in the first infrared thermal image $I_1$.

Accordingly, it is possible to separate the background reflection and the temperature distribution of the object surface in the first infrared thermal image $I_1$ and the second infrared thermal image $I_{2-1}$ in an order of the region (0)→the region (1)→the region (2)→the region (3) with the same procedure as described above based on the region (the region surrounded by the thick solid line frame) determined as background reflection in the first infrared thermal image $I_1$ and the region (the region surrounded by the thin dotted line frame) determined as background reflection in the second infrared thermal image $I_{2-1}$, while the region where there is no background reflection in the first infrared thermal image $I_1$ and there is background reflection only in the second infrared thermal image $I_{2-1}$ is set as the region (0).

A case where the temperature distribution of the background reflection is different in the first infrared thermal image and the second infrared thermal image is considered, and in the discrimination processing of the background reflection, it is desirable that the first processing unit 120 determines whether or not the temperature distribution of the background reflection is the same in the first infrared thermal image $I_1$ and the second infrared thermal image $I_{2-1}$ in determining (discriminating) background reflection in the first infrared thermal image $I_1$ and the second infrared thermal image $I_{2-1}$. In a case where the temperature distribution of the background reflection is different in the first infrared thermal image $I_1$ and the second infrared thermal image $I_{2-1}$, it is desirable to determine which of the first infrared thermal image $I_1$ and the second infrared thermal image $I_{2-1}$ is an image with less background reflection. Such determination can be performed by obtaining the peculiar temperature distributions (the distribution that locally has cohesion and is different in temperature from the periphery) in both images of the first infrared thermal image $I_1$ and the second infrared thermal image $I_{2-1}$.

For example, for the method that divides the first infrared thermal image $I_1$ into the regions of the predetermined size (small size) and determines the background reflection for each divided region of the small size, the rectangular background reflection region (for example, the region shown by the white dotted line in FIG. 4D) finally obtained in the first infrared thermal image $I_1$ is compared with the region (the rectangular region including the peculiar temperature distribution obtained in the first infrared thermal image $I_1$) of the peculiar temperature distribution of the first infrared thermal image $I_1$ overlapping the region, and in a case where the region of the peculiar temperature distribution is greater than the background reflection region by a predetermined degree or more, determination can be made that the temperature distributions of the background reflection of the first infrared thermal image $I_1$ and the second infrared thermal image $I_{2-1}$ corresponding to the background reflection region are different, and the second infrared thermal image $I_{2-1}$ is an image with less background reflection. On the other hand, in a case where the background reflection region in the first infrared thermal image $I_1$ and the region of the peculiar temperature distribution of the first infrared thermal image $I_1$ overlapping the region match each other within a predetermined range, the rectangular background reflection region in the second infrared thermal image $I_{2-1}$ corresponding to the background reflection region is compared with the region (the rectangular region including the peculiar temperature distribution obtained in the second infrared thermal image $I_{2-1}$) of the peculiar temperature distribution of the second infrared thermal image $I_{2-1}$ overlapping the region, and in a case where the region of the peculiar temperature distribution is greater than the background reflection region by a predetermined degree or more, determination can be made that the temperature distributions of the background reflection of the first infrared thermal image $I_1$ and the second infrared thermal image $I_{2-1}$ corresponding to the background reflection region are different, and the first infrared thermal image $I_1$ is an image with less background reflection. In a case where the background reflection region in the second infrared thermal image $I_{2-1}$ and the region of the peculiar temperature distribution of the second infrared thermal image $I_{2-1}$ overlapping the region also match each other within a predetermined range, determination can be made that the temperature distributions of the background reflection of the first infrared thermal image $I_1$ and the second infrared thermal image $I_{2-1}$ corresponding to the background reflection region are the same.

For example, for the method that obtains the peculiar temperature distributions in the first infrared thermal image $I_1$ and determines the background reflection regarding each obtained peculiar temperature distribution, first, the corresponding region of the second infrared thermal image $I_{2-1}$ is obtained regarding each peculiar temperature distribution (for example, the temperature distribution of the rectangular region shown by the white dotted line in FIG. 5) of the first infrared thermal image $I_1$ to determine background reflection (in a case where the correlation value of the peculiar temperature distribution in the first infrared thermal image $I_1$ and the temperature distribution of the corresponding region in the second infrared thermal image $I_{2-1}$ is equal to or higher than the predetermined value, and the position of the peculiar temperature distribution in the first infrared thermal image $I_1$ and the position of the corresponding region in the second infrared thermal image $I_{2-1}$ are different (deviate), determination of background reflection is made), in a case where determination of background reflection is made, the corresponding region (background reflection region) in the second infrared thermal image $I_{2-1}$ is compared with the region (the rectangular region including the peculiar temperature distribution obtained in the second infrared thermal image $I_{2-1}$) of the peculiar temperature distribution of the second infrared thermal image $I_{2-1}$ overlapping the region, and in a case where the region of the peculiar temperature distribution is greater than the background reflection region by a predetermined degree or more, determination can be made that the temperature distributions of the background reflection of the first infrared thermal image $I_1$ and the second infrared thermal image $I_{2-1}$ corresponding to the background reflection region are different, and the first infrared thermal image $I_1$ is an image with less background reflection. On the other hand, in a case where the background reflection region in the second infrared thermal image $I_{2-1}$ and the region of the peculiar temperature distribution of the second infrared thermal image $I_{2-1}$ overlapping the region match each other within a predetermined range, determination can be made that the temperature distributions of the background reflection of the first infrared thermal image $I_1$ and the second infrared thermal image $I_{2-1}$ corresponding to the background reflection region are the same. In a case where a temperature distribution (a temperature distribution where the correlation value is smaller than the predetermined value even in the region in the second infrared thermal image $I_{2-1}$ having the highest correlation (similarity)) where there is no corresponding region of the second infrared thermal image $I_{2-1}$ is included in each peculiar temperature distribution in the first infrared thermal image $I_1$, the first infrared thermal image $I_1$ and the second infrared thermal image $I_{2-1}$ are exchanged (the first infrared thermal image $I_1$ is set as the second infrared thermal image $I_{2-1}$, and the second infrared thermal image $I_{2-1}$ is set as the first infrared thermal image $I_1$), the corresponding region of the second infrared thermal image $I_{2-1}$ is obtained similarly regarding each peculiar temperature distribution of the first infrared thermal image $I_1$ to determine background reflection, and in a case where determination of background reflection is made, the corresponding region (background reflection region) in the second infrared thermal image $I_{2-1}$ is compared with the region of the peculiar temperature distribution of the second infrared thermal image $I_{2-1}$ overlapping the region, and in a case where the region of the peculiar temperature distribution is greater than the background reflection region by a predetermined degree or more, determination can be made that the temperature distributions of the background reflection of the first infrared thermal image $I_1$ and the second infrared thermal image $I_{2-1}$ corresponding to the background reflection region are different, and the first infrared thermal image $I_1$ is an image with less background reflection.

In a case where background reflection is determined using a machine learning method, the region of background reflection can be determined with the first infrared thermal image $I_1$ and the second infrared thermal image $I_{2-1}$ after registration as input by the machine learning method for object detection or by the machine learning method for image segmentation described above, and determination can be performed regarding whether or not the temperature distribution of the background reflection is the same in the first infrared thermal image $I_1$ and the second infrared thermal image $I_{2-1}$, and regarding which of the first infrared thermal image $I_1$ and the second infrared thermal image $I_{2-1}$ is an image with less background reflection in a case where the temperature distribution of the background reflection is different in the first infrared thermal image $I_1$ and the second infrared thermal image $I_{2-1}$.

As described above, in the discrimination processing of the background reflection, in determining (discriminating) the background reflection of the first infrared thermal image $I_1$ and the second infrared thermal image $I_{2-1}$, the first processing unit 120 determines whether or not the temperature distribution of the background reflection is the same in the first infrared thermal image $I_1$ and the second infrared thermal image $I_{2-1}$ and which of the first infrared thermal image $I_1$ and the second infrared thermal image $I_{2-1}$ is an image with less background reflection in a case where the temperature distribution of the background reflection is different in the first infrared thermal image $I_1$ and the second infrared thermal image $I_{2-1}$, so that it is possible to correctly separate the temperature distribution by the background reflection and the temperature distribution of the object surface in any case in the suppression processing of the background reflection. In a case where the temperature distribution of the background reflection is the same in the first infrared thermal image $I_1$ and the second infrared thermal image $I_{2-1}$, it is possible to perform separation with the above-described procedure. In a case where the temperature distribution of the background reflection is different in the first infrared thermal image $I_1$ and the second infrared thermal image $I_{2-1}$, it is possible to separate the background reflection and the temperature distribution of the object surface in the first infrared thermal image $I_1$ and the second infrared thermal image $I_{2-1}$ in the order of the region (0)→the region (1)→the region (2) . . . with the above-described procedure based on the background reflection region in the image with less background reflection and the corresponding region in the other image, while the region where there is no background reflection in the image with less background reflection and there is background reflection only in the other image is set as the region (0).

The first processing unit 120 can execute the suppression processing of the background reflection of suppressing background reflection by separating the background reflection and the temperature distribution of the object surface with the above-described procedure.

That is, the first processing unit 120 can suppress background reflection by separating the temperature distribution of the object surface in the first infrared thermal image $I_1$ as shown in FIG. 6D or by separating the temperature distribution by the background reflection in the first infrared thermal image $I_1$ and subtracting the temperature distribution by the background reflection from the temperature distribution of the original first infrared thermal image $I_1$ as shown in FIG. 6C with the above-described procedure according to the result of the discrimination processing of the background reflection based on the difference between the temperature distribution of the first infrared thermal image $I_1$ and the temperature distribution of the second infrared thermal image $I_{2-1}$ after registration.

Figure 9A:
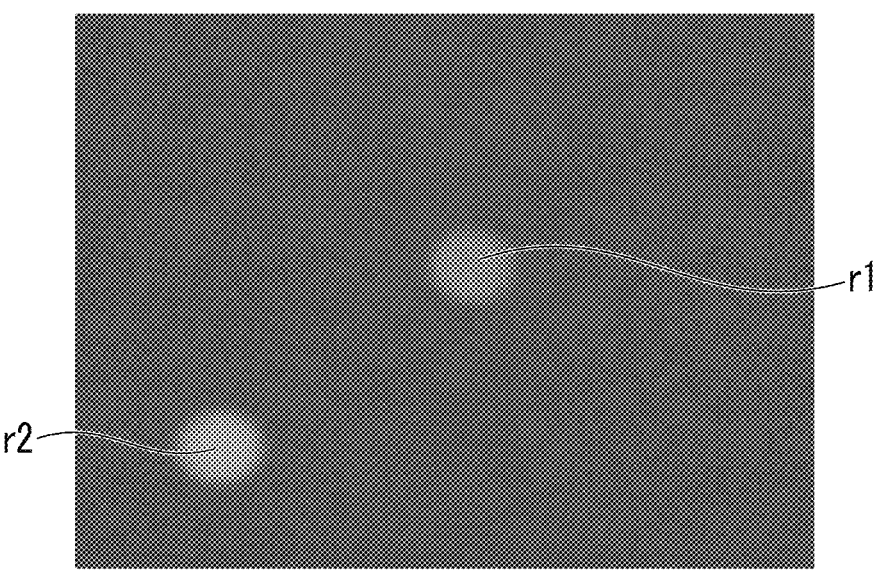
FIG. 9A is a diagram showing an infrared thermal image in which background reflection is suppressed from the first infrared thermal image shown in FIG. 4A.

FIG. 9A is a diagram showing an infrared thermal image in which background reflection is suppressed from the first infrared thermal image shown in FIG. 4A.

An infrared thermal image in which the background reflection R1 is suppressed from the first infrared thermal image Is shown in FIG. 4A with the above-described procedure according to the result of the discrimination processing of the background reflection based on the difference between the temperature distributions of the first infrared thermal image $I_1$ and the second infrared thermal image $I_{2-1}$ after registration shown in FIGS. 4A and 4B is shown in FIG. 9A. The background reflection R1 is suppressed as shown in FIG. 9A, so that the peculiar temperature distributions r1 and r2 on the object surface are easily understood. In particular, in the first infrared thermal image $I_1$ shown in FIG. 4A, while the peculiar temperature distribution r1 of the object surface is not visible because the background reflection R1 overlaps, the background reflection R1 is suppressed, so that the peculiar temperature distribution r1 of the object surface is visible as shown in FIG. 9A. In this way, the peculiar temperature distribution of the object surface overlapping the background reflection is visible through the suppression processing of the background reflection, and it is possible to prevent oversight of the peculiar temperature distribution of the object surface, which should be checked (the peculiar temperature distribution by infrared light emitted from the object surface).

<Enhancement Processing of Background Reflection>

The first processing unit 120 can execute the enhancement processing of the background reflection of enhancing background reflection by separating the background reflection and the temperature distribution of the object surface.

That is, the first processing unit 120 can enhance the background reflection by separating the temperature distribution by the background reflection in the first infrared thermal image $I_1$ as shown in FIG. 6C according to the result of the discrimination processing of the background reflection based on the difference between the temperature distribution of the first infrared thermal image $I_1$ and the temperature distribution of the second infrared thermal image $I_{2-1}$ after registration.

Figure 9B:
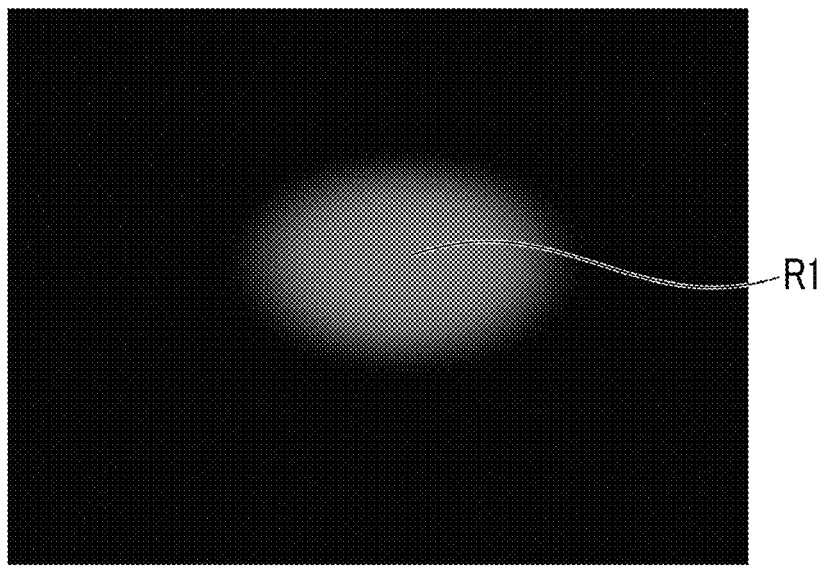
FIG. 9B is a diagram showing an image in which background reflection is enhanced in the first infrared thermal image shown in FIG. 4A.

FIG. 9B is a diagram showing an image in which background reflection is enhanced in the first infrared thermal image shown in FIG. 4A.

An image in which the background reflection R1 is enhanced in the first infrared thermal image $I_1$ shown in FIG.

4A according to the result of the discrimination processing of the background reflection based on the difference between the temperature distributions of the first infrared thermal image $I_1$ and the second infrared thermal image $I_{2-1}$ after registration shown in FIGS. 4A and 4B is shown in FIG. 9B. In FIG. 9B, only the temperature distribution R1 by the background reflection is shown.

The first processing unit 120 can also execute the following enhancement processing of background reflection based on the result of the discrimination processing of the background reflection.

For example, in the first infrared thermal image $I_1$ shown in FIG. 4A, it is conceivable for the large elliptical temperature distribution R1 determined (discriminated) as the background reflection to be colored or drawn with a different brightness, or for a contour line with a different color or brightness to be drawn along the boundary of the temperature distribution R1.

For example, a rectangle (bounding box) (the white dotted line surrounding the region discriminated as the background reflection in FIG. 4D or 5) surrounding the temperature distribution R1 determined (discriminated) as the background reflection may be drawn. The first processing unit 120 executes processing (first processing) including at least one of the discrimination processing, the suppression processing, or the enhancement processing of the background reflection in the above-described manner, and then, displays the image subjected to the processing, on the display unit 14. The first processing unit 120 may display each of the images subjected to the discrimination processing, the suppression processing, and the enhancement processing of the background reflection on the display unit 14 alone, and may display each image or all images in parallel with the original first infrared thermal image $I_1$ or may switch and display each image or all images and the original first infrared thermal image $I_1$.

In the above-described embodiment, a case has been described where two infrared thermal images (first infrared thermal image $I_1$ and second infrared thermal image $I_2$) captured from different positions, respectively, are acquired, background reflection is discriminated based on the two infrared thermal images, and the suppression processing and/or the enhancement processing of the background reflection is executed, but a plurality (three or more) of infrared thermal images captured from different positions, respectively, may be acquired, and the discrimination processing, the suppression processing, and/or the enhancement processing of the background reflection may be executed based on a plurality of infrared thermal images. In this case, in a case where, while one of a plurality of infrared thermal images is set as a first infrared thermal image, each of other infrared thermal images is set as a second infrared thermal image, the discrimination processing, the suppression processing, and/or the enhancement processing of the background reflection is executed on each image in the same manner as described above, and the infrared thermal images are averaged, it is possible to execute the discrimination processing, the suppression processing, and/or the enhancement processing of the background reflection with high accuracy compared to the method based on the two infrared thermal images.

The suppression processing or the enhancement processing of the background reflection is not always executed, and only the discrimination processing of the background reflection may be executed.

In this case, the registration unit 110 may not always perform registration of each pixel of the two infrared thermal images (first infrared thermal image and second infrared thermal image). For example, the registration unit 110 performs only setting of reference points in the first infrared thermal image and the second infrared thermal image, and outputs information of the set reference points to the first processing unit 120 along with the first infrared thermal image and the second infrared thermal image. Then, the first processing unit 120 obtains peculiar temperature distributions in the first infrared thermal image and the second infrared thermal image, and can discriminate whether each peculiar temperature distribution of the first infrared thermal image is the temperature distribution of the object surface or the background reflection, in the following manner. First, three surrounding reference points are set in an ascending order of a distance from the peculiar temperature distribution in the first infrared thermal image, and a positional relationship with the reference points is obtained. Then, in the second infrared thermal image, a place where the positional relationship with the three reference points is the same is set as a position corresponding to the peculiar temperature distribution, and a peculiar temperature distribution is searched for in a predetermined range around the corresponding position. In a case where there is a peculiar temperature distribution, and a difference (deviation) between a position of the peculiar temperature distribution and the corresponding position (the position of the center) is less than a predetermined degree, the peculiar temperature distribution in the first infrared thermal image (and the corresponding peculiar temperature distribution in the second infrared thermal image) is discriminated as the temperature distribution of the object surface, and in a case where there is no peculiar temperature distribution or there is a peculiar temperature distribution, but the difference between the position of the peculiar temperature distribution and the position of the center is equal to or greater than the predetermined degree, the peculiar temperature distribution in the first infrared thermal image is discriminated as background reflection.

For example, in a case where the ratio of the distance between the peculiar temperature distribution and the three surrounding reference points is 1:1:2 in the first infrared thermal image, in the second infrared thermal image, a peculiar temperature distribution may be searched for around a place where the ratio of the distance from the three reference points is 1:1:2.

In the above-described embodiment, although the first processing unit 120 executes the suppression processing or the enhancement processing of the background reflection based on the result of the discrimination processing of the background reflection, the first processing unit 120 can execute the suppression processing or the enhancement processing of the background reflection without always discriminating the background reflection.

Specifically, the first processing unit 120 can suppress the background reflection by averaging the two infrared thermal images (first infrared thermal image and second infrared thermal image) registered by and input from the registration unit 110. Through averaging, the temperature distributions of the object surface registered in the two infrared thermal images are substantially unchanged, and the background reflection that deviates in position is reduced (suppressed). The first processing unit 120 can enhance the background reflection by subtracting the averaged infrared thermal image from the original first infrared thermal image. In a case where a plurality of (three or more) infrared thermal images are acquired, and in a case where all infrared thermal images are averaged after registration, it is possible to suppress the background reflection compared to a case where there are the two infrared thermal images, and the averaged image is subtracted from the original image, so that it is possible to enhance the background reflection compared to a case where there are the two infrared thermal images.

Second Embodiment of Image Analysis Device

Figure 10:
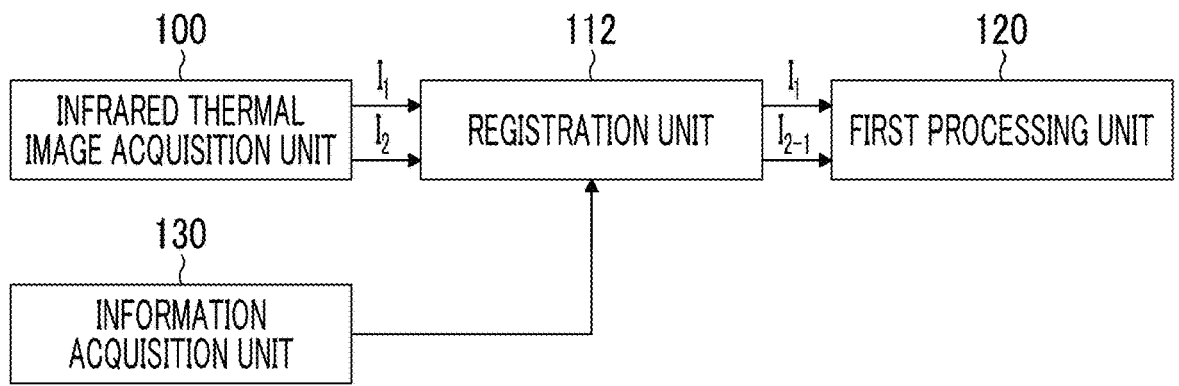
FIG. 10 is a functional block diagram showing a second embodiment of an image analysis device according to the present invention.

FIG. 10 is a functional block diagram showing a second embodiment of an image analysis device according to the present invention, and in particular, a portion that performs registration of a first infrared thermal image and a second infrared thermal image is different from the image analysis device of the first embodiment shown in FIG. 3.

That is, the image analysis device of the second embodiment shown in FIG. 10 is different from the image analysis device of the first embodiment shown in FIG. 3 in that an information acquisition unit 130 is further provided, and registration processing in a registration unit 112 is different.

The information acquisition unit 130 acquires each of first information indicating a first imaging position and a first imaging direction corresponding to the first infrared thermal image $I_1$ and second information indicating a second imaging position and a second imaging direction corresponding to the second infrared thermal image $I_2$.

For example, the imaging positions P1 and P2 (first imaging position and second imaging position) of the infrared cameras 20 and 22 shown in FIG. 2 and imaging directions (first imaging direction and second imaging direction) of the infrared cameras 20 and 22 are acquired.

Information of the respective imaging positions can be acquired by known equipment that performs positioning, such as Global Positioning System (GPS) positioning, Wi-Fi positioning, or sound wave positioning, mounted in the infrared cameras 20 and 22. Information of the respective imaging directions can be acquired by known equipment that measures a direction or a posture, such as a gyro sensor or an acceleration sensor, mounted in the infrared cameras 20 and 22.

The first information indicating the first imaging position and the first imaging direction corresponding to the first infrared thermal image $I_1$ and the second information indicating the second imaging position and the second imaging direction corresponding to the second infrared thermal image $I_2$ acquired by the information acquisition unit 130 are output to the registration unit 112.

The first infrared thermal image $I_1$ and the second infrared thermal image $I_2$ are input to the registration unit 112 from the infrared thermal image acquisition unit 100. The registration unit 112 performs registration such that the positions with respect to the same point on the object surface match each other in the first infrared thermal image $I_1$ and the second infrared thermal image $I_2$ (associates the values of the first infrared thermal image $I_1$ and the second infrared thermal image $I_2$ corresponding to each point (the same point) in the object surface) similarly to the registration unit 110 shown in FIG. 3, but is different from the registration unit 110 shown in FIG. 3 in that the first information indicating the first imaging position and the first imaging direction corresponding to the first infrared thermal image $I_1$ and the second information indicating the second imaging position and the second imaging direction corresponding to the second infrared thermal image $I_2$ are used for registration, and high-accuracy registration is performed.

Specifically, the registration unit 112 specifies the position of the reference point on the object surface (the object surface in a three-dimensional space to be imaged) from the positions of the reference points set in the first infrared thermal image $I_1$ and the second infrared thermal image $I_2$ according to the first information and the second information (specifies a position of an intersection of a straight line passing through the reference point in an imaging plane (image plane) from an optical center of an imaging optical system of the infrared camera 20 that captures the first infrared thermal image $I_1$ and a straight line passing through the reference point in an imaging plane (image plane) from an optical center of an imaging optical system of the infrared camera 22 that captures the second infrared thermal image $I_2$, as the position of the reference point on the object surface), estimates the shape of the object surface from the position of each reference point on the object surface, and sets each non-reference point other than the reference points on the estimated object surface, and estimates and associates a value of the first infrared thermal image $I_1$ and a value of the second infrared thermal image $I_2$ corresponding to the non-reference point. With this method, it is possible to perform the registration of the first infrared thermal image $I_1$ and the second infrared thermal image $I_2$. With this method, it is possible to perform registration with high accuracy compared to the method that performs registration with geometric correction in the first embodiment.

The first information indicating the first imaging position and the first imaging direction corresponding to the first infrared thermal image $I_1$ and the second information indicating the second imaging position and the second imaging direction corresponding to the second infrared thermal image $I_2$ may be information acquired based on the first infrared thermal image $I_1$ and the second infrared thermal image $I_2$. For example, the imaging positions and the imaging directions of the respective infrared thermal images can be obtained by applying a structure from motion (SfM: multi-viewpoint stereo measurement) technique to the first infrared thermal image $I_1$ and the second infrared thermal image $I_2$. The imaging positions and the imaging directions of the respective infrared thermal images can also be obtained similarly using a visual simultaneous localization and mapping (SLAM) technique. At present, a technique that estimates an imaging position and an imaging direction using a plurality of captured images has been researched and suggested, and the imaging positions and the imaging directions of the respective infrared thermal images may be obtained using any technique. An infrared thermal image obtained by imaging the object at a different position from the first infrared thermal image $I_1$ and the second infrared thermal image $I_2$ may be used. That is, the imaging positions and the imaging directions of the respective infrared thermal images (first infrared thermal image $I_1$ and second infrared thermal image $I_2$) may be obtained using a plurality of infrared thermal images including at least the first infrared thermal image $I_1$ and the second infrared thermal image $I_2$. The information acquisition unit 130 may obtain the imaging positions and the imaging directions of the respective infrared thermal images (may obtain the first information and the second information) based on a plurality of infrared thermal images including at least the first infrared thermal image $I_1$ and the second infrared thermal image $I_2$ according to the technique for estimating the imaging position and the imaging direction using a plurality of captured images in this way or may acquire the first information and the second information estimated in advance according to such a technique.

Also in the image analysis device of the second embodiment, similarly to the image analysis device of the first embodiment, the suppression processing or the enhancement processing of the background reflection may not be executed, and only the discrimination processing of the background reflection may be executed, and in this case, similarly to the image analysis device of the first embodiment, the registration unit 112 may not always perform registration of each pixel of the first infrared thermal image $I_1$ and the second infrared thermal image $I_2$. Here, the image analysis device of the second embodiment can more accurately discriminate background reflection compared to the image analysis device of the first embodiment. For example, it is possible to accurately discriminate background reflection in the following manner. First, in the image analysis device of the second embodiment, the registration unit 112 sets reference points in the first infrared thermal image $I_1$ and the second infrared thermal image $I_2$, then, specifies a position on the object surface regarding each reference point based on the positions in the first infrared thermal image $I_1$ and the second infrared thermal image $I_2$, the first information, and the second information with the above-described method, and estimates a shape of the object surface from the position of each reference point on the object surface. Then, the registration unit 112 outputs information of the estimated shape of the object surface, the first information, and the second information to the first processing unit 120 along with the first infrared thermal image $I_1$ and the second infrared thermal image $I_2$.

Next, the first processing unit 120 obtains the peculiar temperature distributions in the first infrared thermal image $I_1$ and the second infrared thermal image $I_2$, then, estimates the position on the object surface regarding each peculiar temperature distribution in the first infrared thermal image Is based on information of the shape of the object surface and the first information, and estimates a corresponding position in the second infrared thermal image $I_2$ from the position on the object surface based on the second information. Then, the first processing unit 120 searches for a peculiar temperature distribution in a predetermined range around the corresponding position in the second infrared thermal image $I_2$ regarding each peculiar temperature distribution of the first infrared thermal image $I_1$, discriminates the peculiar temperature distribution in the first infrared thermal image $I_1$ (and the corresponding peculiar temperature distribution in the second infrared thermal image $I_2$) as the temperature distribution of the object surface in a case where there is a peculiar temperature distribution and the difference (deviation) between the position of the peculiar temperature distribution and the corresponding position (the position of the center) is less than a predetermined degree, and discriminates the peculiar temperature distribution in the first infrared thermal image $I_1$ as background reflection in a case where there is no peculiar temperature distribution or there is a peculiar temperature distribution, but the difference between the position of the peculiar temperature distribution and the position of the center is equal to or greater than the predetermined degree. In this way, because the image analysis device of the second embodiment can more accurately obtain the position in the second infrared thermal image $I_2$ corresponding to each peculiar temperature distribution of the first infrared thermal image $I_1$ based on the first information and the second information, compared to the image analysis device of the first embodiment, as a result, it is possible to more accurately discriminate background reflection.

Even in the image analysis device of the first embodiment shown in FIG. 3, that is, the image analysis device of the embodiment with no information acquisition unit 130, the registration unit 110 can obtain the imaging positions and the imaging directions of the respective infrared thermal images (first infrared thermal image $I_1$ and second infrared thermal image $I_2$) based on a plurality of infrared thermal images including at least the first infrared thermal image $I_1$ and the second infrared thermal image $I_2$ according to the above-described technique, such as SfM or visual SLAM. In this case, also in the image analysis device of the first embodiment, similarly to the image analysis device of the second embodiment, the registration unit 110 can specify the position of each reference point on the object surface from the positions of the reference points set in the first infrared thermal image $I_1$ and the second infrared thermal image $I_2$ according to information of the imaging positions and the imaging directions of the infrared thermal images. As a result, similarly to the image analysis device of the second embodiment, the registration unit 110 can perform high-accuracy registration compared to geometric correction. Even in a case where the registration unit 110 does not perform the registration of each pixel, similarly to the image analysis device of the second embodiment, the first processing unit 120 accurately obtains the position in the second infrared thermal image $I_2$ corresponding to each peculiar temperature distribution of the first infrared thermal image $I_1$ based on information of the imaging positions and the imaging directions of the respective infrared thermal images, and can accurately discriminate background reflection.

Third Embodiment of Image Analysis Device

Figure 11:
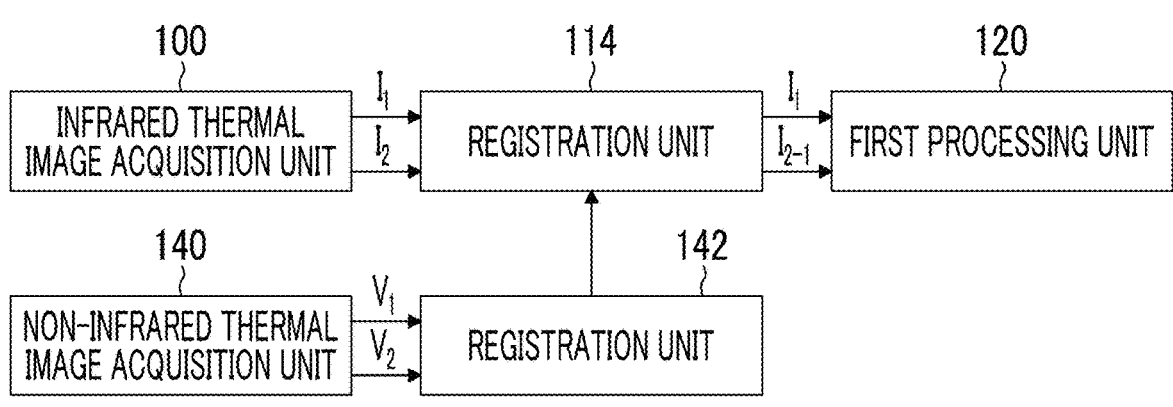
FIG. 11 is a functional block diagram showing a third embodiment of an image analysis device according to the present invention.

FIG. 11 is a functional block diagram showing a third embodiment of an image analysis device according to the present invention, and in particular, a portion that performs registration of a first infrared thermal image and a second infrared thermal image is different from the image analysis device of the first embodiment shown in FIG. 3.

That is, the image analysis device of the third embodiment shown in FIG. 11 is different from the image analysis device of the first embodiment shown in FIG. 3 in that a non-infrared thermal image acquisition unit 140 and a registration unit 142 are further provided, and registration processing in a registration unit 114 is different.

The non-infrared thermal image acquisition unit 140 acquires a first non-infrared thermal image $V_1$ and a second non-infrared thermal image $V_2$ corresponding to the first infrared thermal image $I_1$ and the second infrared thermal image $I_2$, respectively, and outputs the first non-infrared thermal image $V_1$ and the second non-infrared thermal image $V_2$ to the registration unit 142.

The first non-infrared thermal image $V_1$ and the second non-infrared thermal image $V_2$ are images with less background reflection of infrared light, for example, visible light images. Here, an "image with less background reflection of infrared light" means an image in which a ratio of intensity on an image by light in a wavelength range of infrared light to intensity on an image by light in a wavelength range other than the wavelength range (700 nm to 1 mm) of the infrared light is smaller than in the infrared thermal image. The image with less background reflection of infrared light is called a "non-infrared thermal image".

Here, it is assumed that the positions of the first infrared thermal image $I_1$ and the first non-infrared thermal image $V_1$, and the positions of the second infrared thermal image $I_2$ and the second non-infrared thermal image $V_2$ match each other, respectively. The non-infrared thermal images may be images captured corresponding to two infrared thermal images, respectively, or may be images obtained by registering one captured image to each of two infrared thermal images.

The registration unit 142 performs the registration of the input first non-infrared thermal image $V_1$ and second non-infrared thermal image $V_2$. Because the non-infrared thermal images (first non-infrared thermal image $V_1$ and second non-infrared thermal image $V_2$) with less background reflection of infrared light are used, the registration unit 142 performs registration by obtaining and associating corresponding pixels of the second non-infrared thermal image $V_2$ having high correlation (similarity) with respect to all pixels of the first non-infrared thermal image $V_1$. With this method, it is possible to perform registration with high accuracy compared to the method of the registration of the first infrared thermal image $I_1$ and the second infrared thermal image $I_2$ by the registration unit 110 shown in FIG. 3 (the method that extracts only the correspondence points (pixels) having the correlation (similarity) equal to or greater than the predetermined threshold value as a reference point and that performs registration based on the positions of the reference points). Alternatively, the registration unit 142 may perform registration using the same method as the registration by the registration unit 110 shown in FIG. 3, that is, may extract only the correspondence points (pixels) having the correlation (similarity) equal to or greater than the predetermined threshold value as a reference point and may perform registration based on the positions of the reference points. Even in a case where registration is performed by this method, because the non-infrared thermal images with less background reflection of infrared light are used, it is possible to significantly reduce the threshold value of the correlation (similarity) for extracting the reference point, and to extract a significantly large number of reference points, compared to the registration by the registration unit 110 shown in FIG. 3 (compared to a case where the infrared thermal images are used), and as a result, it is possible to perform registration with high accuracy. It is preferable that visible light images are used as the non-infrared thermal images (this is because visible light cameras are widespread and inexpensive, and a visible light image is often acquired along with an infrared thermal image for the purpose of observing an appearance of an object). In a case where a visible light image is used, because the visible light image has a lot of texture to be a key for performing registration and is sharp and clear compared to an infrared thermal image, even in this sense, it is possible to perform registration with high accuracy compared to a case where an infrared thermal image is used.

The first infrared thermal image $I_1$ and the second infrared thermal image $I_2$ are input to the registration unit 114 from the infrared thermal image acquisition unit 100, and information of the registration of the first non-infrared thermal image $V_1$ and the second non-infrared thermal image $V_2$ (position information of the correspondence points of both images) is input to the to the registration unit 114 from the registration unit 142. The registration unit 114 applies information of the registration of the first non-infrared thermal image $V_1$ and the second non-infrared thermal image $V_2$ to the registration of the first infrared thermal image $I_1$ and the second infrared thermal image $I_2$ to perform the registration of the first infrared thermal image $I_1$ and the second infrared thermal image $I_2$. The registration unit 142 does not need to actually register the first non-infrared thermal image $V_1$ and the second non-infrared thermal image $V_2$, and may acquire registration information between both images. That is, the "registration of the first non-infrared thermal image $V_1$ and the second non-infrared thermal image $V_2$" of the registration unit 142 described above may acquire information of the registration of the first non-infrared thermal image $V_1$ and the second non-infrared thermal image $V_2$.

Also in the image analysis device of the third embodiment, similarly to the image analysis device of the first embodiment, the suppression processing or the enhancement processing of the background reflection may not be executed, and only the discrimination processing of the background reflection may be executed. For the image analysis device of the third embodiment, because only the discrimination processing of the background reflection may be executed, a method in which the registration of the first infrared thermal image $I_1$ and the second infrared thermal image $I_2$ is not performed at all, that is, a method in which the registration unit 114 of the infrared thermal images and the registration unit 142 of the non-infrared thermal images are not required, can also be employed (of course, similarly to a case where only the discrimination processing is executed in the image analysis device of the first embodiment, a method in which the registration of each pixel of the first infrared thermal image $I_1$ and the second infrared thermal image $I_2$ is not performed, and only the setting of the reference points is performed can also be employed). In this case, the infrared thermal image acquisition unit 100 outputs the acquired first infrared thermal image $I_1$ and second infrared thermal image $I_2$ directly to the first processing unit 120, or the non-infrared thermal image acquisition unit 140 outputs the acquired first non-infrared thermal image $V_1$ and second non-infrared thermal image $V_2$ directly to the first processing unit 120. Then, the first processing unit 120 obtains the peculiar temperature distributions in the first infrared thermal image $I_1$ and the second infrared thermal image $I_2$, then, extracts a distribution at a corresponding position in the non-infrared thermal image $V_1$ regarding each peculiar temperature distribution of the first infrared thermal image $I_1$, and specifies a corresponding position in the second infrared thermal image $I_2$ by specifying a position of a distribution matching the distribution in the second non-infrared thermal image $V_2$. That is, the first processing unit 120 accurately specifies the corresponding position in the second infrared thermal image $I_2$ regarding each peculiar temperature distribution of the first infrared thermal image $I_1$ via the first non-infrared thermal image $V_1$ and the second non-infrared thermal image $V_2$. Then, the first processing unit 120 searches for a peculiar temperature distribution in a predetermined range around the corresponding position specified in the second infrared thermal image $I_2$ regarding each peculiar temperature distribution of the first infrared thermal image $I_1$, discriminates the peculiar temperature distribution in the first infrared thermal image $I_1$ (and the corresponding peculiar temperature distribution in the second infrared thermal image $I_2$) as the temperature distribution of the object surface in a case where there is a peculiar temperature distribution and the difference (deviation) between the position of the peculiar temperature distribution and the corresponding position (the position of the center) is less than a predetermined degree, and discriminates the peculiar temperature distribution in the first infrared thermal image $I_1$ as background reflection in a case where there is no peculiar temperature distribution or there is a peculiar temperature distribution, but the difference between the position of the peculiar temperature distribution and the position of the center is equal to or greater than the predetermined degree. In this way, because the image analysis device of the third embodiment can more accurately obtain the position in the second infrared thermal image $I_2$ corresponding to each peculiar temperature distribution of the first infrared thermal image $I_1$ via the first non-infrared thermal image $V_1$ and the second non-infrared thermal image $V_2$, compared to the image analysis device of the first embodiment, as a result, it is possible to more accurately discriminate background reflection.

Fourth Embodiment of Image Analysis Device

Figure 12:
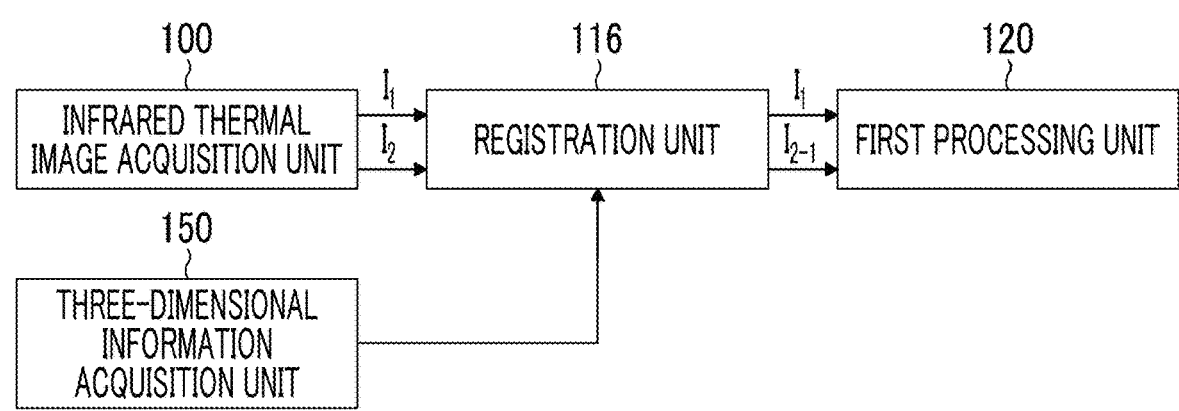
FIG. 12 is a functional block diagram showing a fourth embodiment of an image analysis device according to the present invention.

FIG. 12 is a functional block diagram showing a fourth embodiment of an image analysis device according to the present invention, and in particular, a portion that performs registration of a first infrared thermal image and a second infrared thermal image is different from the image analysis device of the first embodiment shown in FIG. 3.

That is, the image analysis device of the fourth embodiment shown in FIG. 12 is different from the image analysis device of the first embodiment shown in FIG. 3 in that a three-dimensional information acquisition unit 150 is further provided, and registration processing in a registration unit 116 is different.

The three-dimensional information acquisition unit 150 acquires three-dimensional information corresponding to each of the first infrared thermal image $I_1$ and the second infrared thermal image $I_2$. Here, the "three-dimensional information" means information of a surface shape of an object in a three-dimensional space.

The three-dimensional information indicating the surface shape of the object can be acquired by various methods. For example, the three-dimensional information of the object surface can be acquired by measuring a distance to each point on the surface of the object with a distance measurement method, such as light detection and ranging (LiDAR), a stereo camera, a time of flight camera (TOF camera), or an ultrasonic sensor. The three-dimensional information acquired by the three-dimensional information acquisition unit 150 is output to the registration unit 116.

The first infrared thermal image $I_1$ and the second infrared thermal image $I_2$ are input to the registration unit 116 from the infrared thermal image acquisition unit 100, and the three-dimensional information corresponding to each infrared thermal image is input to the registration unit 116 from the three-dimensional information acquisition unit 150. The registration unit 116 performs high-accuracy registration of the first infrared thermal image $I_1$ and the second infrared thermal image $I_2$ using the three-dimensional information corresponding to each infrared thermal image, in addition to the first infrared thermal image $I_1$ and the second infrared thermal image $I_2$.

Specifically, the registration unit 116 first obtains the position of each point on the object surface corresponding to each pixel (the position of each point where each pixel of the infrared thermal image is projected onto the object surface) regarding one infrared thermal image of the first infrared thermal image $I_1$ and the second infrared thermal image $I_2$ based on the three-dimensional information corresponding to the infrared thermal image. Next, the position on the object surface in the three-dimensional information corresponding to the other infrared thermal image regarding each point on the object surface described above is obtained by matching a three-dimensional shape of the object surface in the three-dimensional information corresponding to the first infrared thermal image $I_1$ and a three-dimensional shape of the object surface in the three-dimensional information corresponding to the second infrared thermal image $I_2$. Finally, a position in the other corresponding infrared thermal image (a position where each point on the object surface is projected onto the infrared thermal image) regarding each point on the object surface in the three-dimensional information corresponding to the other infrared thermal image is obtained based on the three-dimensional information corresponding to the other infrared thermal image. That is, the position on the object surface in the three-dimensional information corresponding to the first infrared thermal image $I_1 \rightarrow$ the position on the object surface in the three-dimensional information corresponding to the second infrared thermal image $I_2 \rightarrow$ the position in the second infrared thermal image $I_2$ regarding each pixel of the first infrared thermal image $I_1$ (or the position on the object surface in the three-dimensional information corresponding to the second infrared thermal image $I_2 \rightarrow$ the position on the object surface in the three-dimensional information corresponding to the first infrared thermal image $I_1 \rightarrow$ the position in the first infrared thermal image $I_1$ regarding each pixel of the second infrared thermal image $I_2$) are obtained in this order. With this method, it is possible to perform high-accuracy registration of the first infrared thermal image $I_1$ and the second infrared thermal image $I_2$ (it is possible to associate the positions (and the values) in the first infrared thermal image $I_1$ and the second infrared thermal image $I_2$ corresponding to each point (the same point) on the object surface with high accuracy). The above-described method presumes that a relationship between a coordinate system of the three-dimensional information and a position and a direction of an imaging optical system of an infrared thermal image is known. For example, in a case where the three-dimensional information is acquired by a distance measurement method, such as LiDAR, a relationship between a distance measurement system and the position and the direction of the imaging optical system of the infrared thermal image is known. According to this presumption, the registration unit 116 can obtain the position of each point on the object surface corresponding to each pixel of the infrared thermal image and the position in the infrared thermal image corresponding to each point on the object surface.

The three-dimensional information acquisition unit 150 does not always acquire the three-dimensional information corresponding to each of the first infrared thermal image $I_1$ and the second infrared thermal image $I_2$, and may acquire one kind of information indicating the surface shape of the object, for example, drawing data (including computer-aided design (CAD) data) of the object as three-dimensional information. In this case, the three-dimensional information acquisition unit 150 acquires each of information of an imaging position and an imaging direction corresponding to the first infrared thermal image $I_1$ and information of an imaging position and an imaging direction corresponding to the second infrared thermal image $I_2$ along with the three-dimensional information, and outputs the acquired information to the registration unit 116 along with the three-dimensional information. Information of the imaging position and the imaging direction corresponding to each infrared thermal image can be acquired by the above-described equipment that performs positioning, such as GPS positioning or Wi-Fi positioning, or by the equipment that measures the direction or the posture, such as a gyro sensor. Alternatively, information of the imaging position and the imaging direction corresponding to each infrared thermal image can be obtained based on a plurality of infrared thermal images including at least the first infrared thermal image $I_1$ and the second infrared thermal image $I_2$ according to the above-described technique that estimates the imaging position and the imaging direction using a plurality of captured images, such as the SfM technique. The three-dimensional information acquisition unit 150 can acquire information of the imaging positions and the imaging directions corresponding to the respective infrared thermal images via the same method as the method by which the information acquisition unit 130 acquires the first information and the second information in the image analysis device of the second embodiment described above.

The first infrared thermal image $I_1$ and the second infrared thermal image $I_2$ are input to the registration unit 116 from the infrared thermal image acquisition unit 100, and the three-dimensional information, information of the imaging position and the imaging direction corresponding to the first infrared thermal image $I_1$, and information of the imaging position and the imaging direction corresponding to the second infrared thermal image $I_2$ are input to the registration unit 116 from the three-dimensional information acquisition unit 150. The registration unit 116 performs high-accuracy registration of the first infrared thermal image $I_1$ and the second infrared thermal image $I_2$ using information of the imaging positions and the imaging directions corresponding to the respective infrared thermal images and the three-dimensional information, in addition to the first infrared thermal image $I_1$ and the second infrared thermal image $I_2$. Specifically, the registration unit 116 first obtains the position of each point (the position of each point where each pixel of the infrared thermal image is projected onto the object surface) in the object surface corresponding to each pixel regarding one infrared thermal image of the first infrared thermal image $I_1$ and the second infrared thermal image $I_2$ based on information of the imaging position and the imaging direction corresponding to the infrared thermal image and on the three-dimensional information. Then, the position (the position where each point on the object surface is projected onto the infrared thermal image) in the other infrared thermal image regarding each point on the object surface described above is obtained based on information of the imaging position and the imaging direction corresponding to the other infrared thermal image and on the three-dimensional information. That is, the position on the object surface $\rightarrow$ the position in the second infrared thermal image $I_2$ regarding each pixel of the first infrared thermal image $I_1$ (or the position on the object surface $\rightarrow$ the position in the first infrared thermal image $I_1$ regarding each pixel of the second infrared thermal image $I_2$) are obtained in this order. With this method, it is possible to perform high-accuracy registration of the first infrared thermal image $I_1$ and the second infrared thermal image $I_2$.

Also in the image analysis device of the fourth embodiment, similarly to the image analysis device of the first embodiment, the suppression processing or the enhancement processing of the background reflection may not be executed, and only the discrimination processing of the background reflection may be executed. For the image analysis device of the fourth embodiment, similarly to the image analysis device of the third embodiment, because only the discrimination processing of the background reflection may be executed, a method in which the registration of the first infrared thermal image $I_1$ and the second infrared thermal image $I_2$ is not performed at all, that is, a method in which the registration unit 116 of the infrared thermal images is not required, can be employed. In this case, similarly to the image analysis device of the third embodiment, the infrared thermal image acquisition unit 100 outputs the acquired first infrared thermal image $I_1$ and second infrared thermal image $I_2$ directly to the first processing unit 120, or the three-dimensional information acquisition unit 150 outputs the acquired three-dimensional information (and as necessary, information of the imaging position and the imaging direction corresponding to the first infrared thermal image $I_1$ and information of the imaging position and the imaging direction corresponding to the second infrared thermal image $I_2$) directly to the first processing unit 120.

Then, similarly to the image analysis device of the third embodiment, the first processing unit 120 accurately obtains the corresponding position in the second infrared thermal image $I_2$ regarding each peculiar temperature distribution of the first infrared thermal image $I_1$ via the three-dimensional information, and can accurately discriminate background reflection (because the background reflection discrimination processing by the first processing unit 120 herein is the same as the background reflection discrimination processing by the first processing unit 120 in the image analysis device of the third embodiment described above, detailed description of the processing will not be repeated).

The present invention is characterized in that the discrimination processing and the like of the background reflection are executed based on the difference in position between the temperature distribution of the first infrared thermal image $I_1$ and the temperature distribution of the second infrared thermal image $I_2$ with respect to the surface of the object. Accordingly, it is preferable that information (information with less background reflection of infrared light) representing the surface of the object is also acquired, in addition to the infrared thermal images. The above-described third embodiment is an embodiment in which the non-infrared thermal images are acquired as information representing the surface of the object, and the fourth embodiment is an embodiment in which the three-dimensional information is acquired as information representing the surface of the object. Both embodiments are preferable as an embodiment in which information representing the surface of the object is acquired, in addition the infrared thermal images.

Fifth Embodiment of Image Analysis Device

Figure 13:
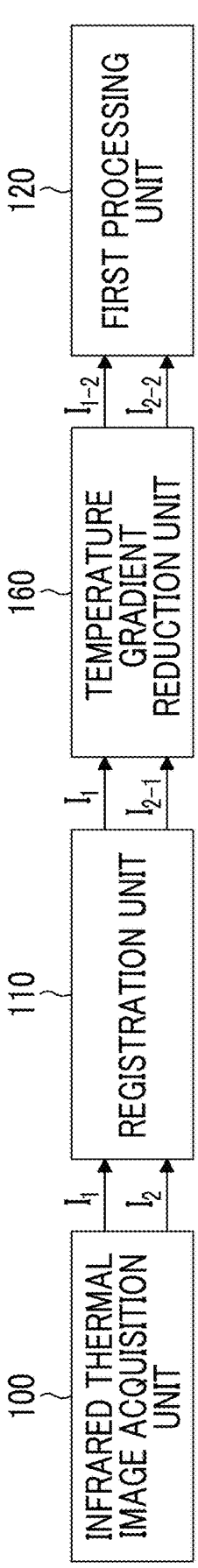
FIG. 13 is a functional block diagram showing a fifth embodiment of an image analysis device according to the present invention.

FIG. 13 is a functional block diagram showing a fifth embodiment of an image analysis device according to the present invention, and in particular, the image analysis device of the fifth embodiment is different from the image analysis device of the first embodiment shown in FIG. 3 in that a temperature gradient reduction unit is further provided.

In an infrared thermal image obtained by imaging a concrete structure as an object, an inclination, called a temperature gradient, often occurs in a surface temperature of the structure. In the discrimination processing of the background reflection in the first processing unit 120, because the background reflection can be discriminated with high accuracy in a case where the temperature gradient is reduced from the infrared thermal image, it is preferable to reduce the temperature gradient before the discrimination of the background reflection.

A temperature gradient reduction unit 160 reduces the temperature gradient with respect to the first infrared thermal image $I_1$ and the second infrared thermal image $I_{2-1}$ after registration input from the registration unit 110.

Various methods have been suggested as a method of reducing the temperature gradient, and, for example, the temperature gradient can be reduced with a method described in WO2010/046967A. In the method described in WO2010/046967A, an average temperature distribution image is created by executing moving average processing of sequentially obtaining an average of temperatures for each pixel group of a predetermined number of pixels in the infrared thermal image, and a temperature difference image is created by calculating a temperature difference at the same pixels of the infrared thermal image and the average temperature distribution image. Enhancement processing of enhancing the temperature difference in the temperature difference image is executed and an enhanced image is created. The enhanced image is an image indicating a distribution of temperature change other than the temperature gradient.

The temperature gradient reduction unit 160 reduces the temperature gradient in the first infrared thermal image $I_1$ and the second infrared thermal image $I_{2-1}$ after registration, for example, with the method described in WO2010/046967A, and outputs a first infrared thermal image $I_{1-2}$ and a second infrared thermal image $I_{2-2}$ with the reduced temperature gradient to the first processing unit 120.

The first processing unit 120 can execute the discrimination processing of the background reflection with high accuracy by using the first infrared thermal image $I_{1-2}$ and the second infrared thermal image $I_{2-2}$ with the reduced temperature gradient.

Before the discrimination processing of the background reflection in the first processing unit 120, the temperature gradient may be reduced in any processing stage. For example, the temperature gradient reduction unit 160 may reduce the temperature gradient before the registration processing by the registration unit 110. The first infrared thermal image $I_1$ and the second infrared thermal image $I_2$ that are acquired by the infrared thermal image acquisition unit 100 may be infrared thermal images with reduced temperature gradient. The first infrared thermal image $I_1$ and the second infrared thermal image $I_2$ that are acquired by the infrared thermal image acquisition unit 100 include not only the original infrared thermal images captured by the infrared cameras 20 and 22, but also images obtained by subjecting the infrared thermal images to various kinds of image processing, such as noise suppression or edge enhancement. The infrared thermal images and/or images in which background reflection is discriminated, suppressed, and enhanced may be subjected to various kinds of image processing, such as noise suppression or edge enhancement, in any processing stage.

[Image Analysis Method]

Figure 14:
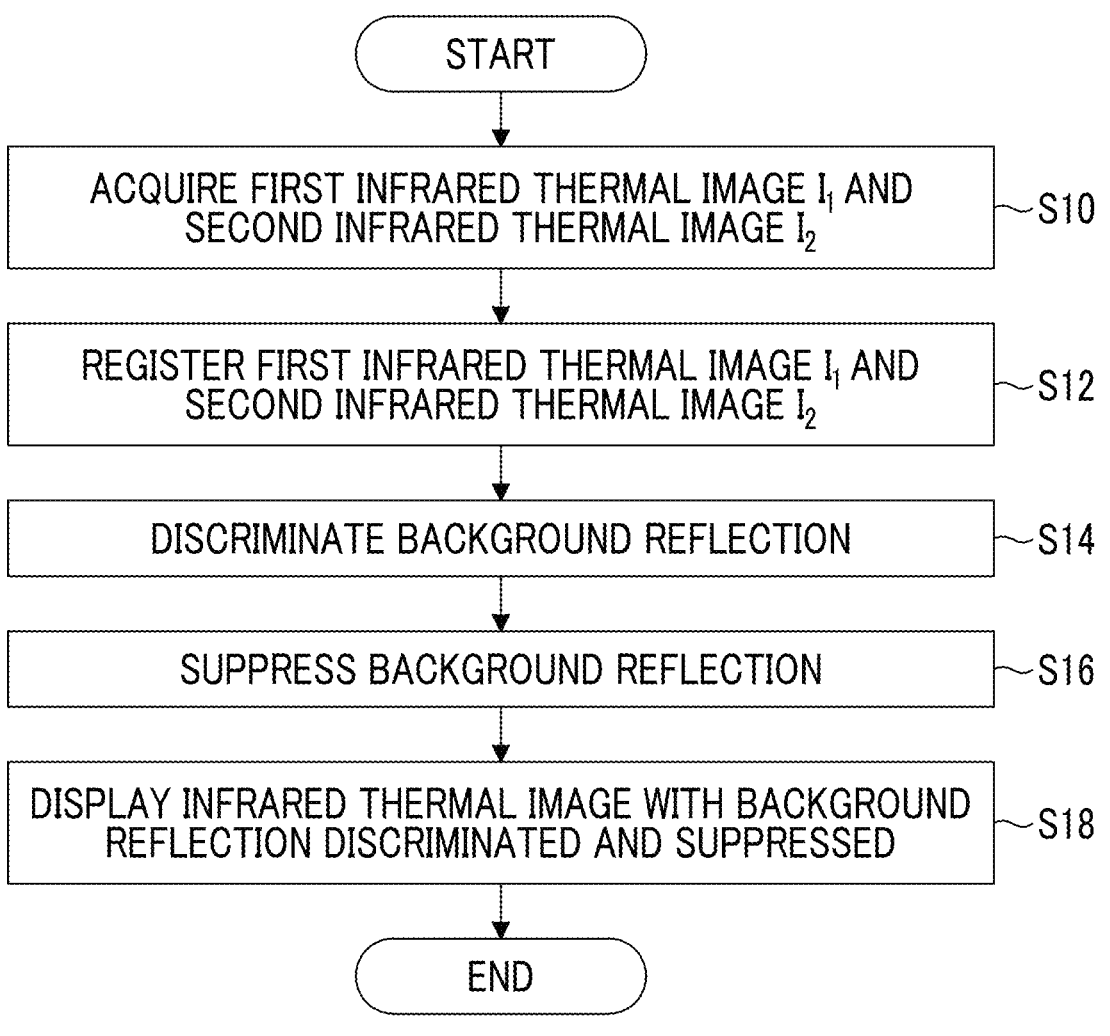
FIG. 14 is a flowchart showing an embodiment of an image analysis method according to the present invention.

FIG. 14 is a flowchart showing an embodiment of an image analysis method according to the present invention. Processing of each step shown in FIG. 14 is executed by the processor 10 of the image analysis device 1 shown in FIG. 1. The flowchart shown in FIG. 14 shows a processing procedure in the image analysis device of the first embodiment shown in FIG. 3. Accordingly, details of the processing of each step will not be repeated.

In FIG. 14, the first infrared thermal image $I_1$ and the second infrared thermal image $I_2$ obtained by imaging the object from the different imaging positions P1 and P2 as shown in FIG. 2 are acquired from the infrared cameras 20 and 22 and the like via the input/output interface 16 based on a user's operation on the operation unit 18 (Step S10).

The processor 10 performs the registration of the acquired first infrared thermal image $I_1$ and second infrared thermal image $I_2$ (Step S12).

Subsequently, the processor 10 executes the discrimination processing of the background reflection of infrared light from the periphery of the object with respect to an infrared thermal image obtained by imaging the object based on the difference between the temperature distribution of the first infrared thermal image $I_1$ and the temperature distribution of the second infrared thermal image $I_{2-1}$ after registration (Step S14).

The processor 10 executes the suppression processing of suppressing the background reflection based on the result of the discrimination processing of the background reflection (Step S16).

Then, the processor 10 displays an image obtained as a result of the discrimination processing and the suppression processing of the background reflection on the display unit 14 (Step S18). The processor 10 may display an image subjected to the enhancement processing of the background reflection on the display unit 14. In a case where the image subjected to the enhancement processing of the background reflection is displayed, in Step S16, the processor 10 executes the enhancement processing of enhancing the background reflection based on the result of the discrimination processing of the background reflection.

The user can accurately discriminate a peculiar temperature distribution by infrared light emitted from the object surface (distinguish from background reflection) based on the infrared thermal image displayed on the display unit 14, and as a result, can accurately discriminate an internal defect (floating or the like) included in the object.

[Other]

In the present embodiment, for example, the hardware structure of the processing units that execute various processing, such as the CPU, is the following various processors. Various processors include a central processing unit (CPU) that is a general-purpose processor configured to execute software (programs) to function as various processing units, a programmable logic device (PLD) that is a processor capable of changing a circuit configuration after manufacture, such as a field-programmable gate array (FPGA), a dedicated electric circuit that is a processor having a circuit configuration dedicatedly designed for executing specific processing, such as an application-specific integrated circuit (ASIC), and the like.

One processing unit may be configured with one of the various processors described above or may be configured with two or more processors (for example, a plurality of FPGAs or a combination of a CPU and an FPGA) of the same type or different types. A plurality of processing units may be configured with one processor. As an example where a plurality of processing units are configured with one processor, first, as represented by a computer, such as a client or a server, there is a form in which one processor is configured with a combination of one or more CPUs and software, and the processor functions as a plurality of processing units. Second, as represented by a system-on-chip (SoC) or the like, there is a form in which a processor that realizes the functions of the entire system including a plurality of processing units with one integrated circuit (IC) chip is used. In this way, various processing units are configured using one or more processors among the various processors described above as a hardware structure.

The hardware structure of the various processors described above is more specifically an electric circuit (circuitry) in which circuit elements, such as semiconductor elements, are combined.

The present invention includes an image analysis program that is installed on a computer and that causes the computer to function as the image analysis device according to the present invention, and a non-volatile storage medium storing the image analysis program.

It goes without saying that the present invention is not limited to the above-described embodiment, and various modifications can be made without departing from the gist of the present invention.

EXPLANATION OF REFERENCES

1: image analysis device
10: processor
12: memory
14: display unit
16: input/output interface
18: operation unit
20, 22: infrared camera
30: infrared radiation source
100: infrared thermal image acquisition unit
110, 112, 114, 116: registration unit
120: first processing unit
130: information acquisition unit
140: non-infrared thermal image acquisition unit
142: registration unit
150: three-dimensional information acquisition unit
160: temperature gradient reduction unit
$I_1$: first infrared thermal image
$I_{1-2}$: first infrared thermal image
$I_2$: second infrared thermal image
$I_{2-1}$: second infrared thermal image
$I_{2-2}$: second infrared thermal image
P1: imaging position
P2: imaging position
S10 to S18: step

What is claimed is:

1. An image analysis device comprising:
a processor,
wherein the processor is configured to:
execute image acquisition processing of acquiring a first infrared thermal image and a second infrared thermal image obtained by imaging an object from different imaging positions, respectively; and
execute first processing including at least one of discrimination processing, suppression processing, or enhancement processing of background reflection of infrared light from a periphery of the object on an infrared thermal image obtained by imaging the object based on at least a difference between a temperature distribution of the first infrared thermal image and a temperature distribution of the second infrared thermal image.

2. The image analysis device according to claim 1, wherein the processor is configured to execute the first processing based on a difference in position of the temperature distribution with respect to a surface of the object.

3. The image analysis device according to claim 1, wherein the processor is configured to:
perform registration for associating values of the first infrared thermal image and the second infrared thermal image with respect to a same point on a surface of the object; and
execute the first processing based on the first infrared thermal image and the second infrared thermal image subjected to the registration.

4. The image analysis device according to claim 1, wherein the processor is configured to:
acquire first information indicating a first imaging position and a first imaging direction corresponding to the first infrared thermal image and second information indicating a second imaging position and a second imaging direction corresponding to the second infrared thermal image; and execute the first processing based on at least the first infrared thermal image, the second infrared thermal image, the first information, and the second information.

5. The image analysis device according to claim 1, wherein the processor is configured to:

acquire a first non-infrared thermal image and a second non-infrared thermal image corresponding to the first infrared thermal image and the second infrared thermal image, respectively; and execute the first processing based on at least the first infrared thermal image, the second infrared thermal image, the first non-infrared thermal image, and the second non-infrared thermal image.

6. The image analysis device according to claim 5, wherein the processor is configured to:

perform registration for associating values of the first infrared thermal image and the second infrared thermal image with respect to a same point on a surface of the object based on at least the first infrared thermal image, the second infrared thermal image, the first non-infrared thermal image, and the second non-infrared thermal image.

7. The image analysis device according to claim 1, wherein the processor is configured to:

acquire three-dimensional information indicating a surface shape of the object; and execute the first processing based on at least the first infrared thermal image, the second infrared thermal image, and the three-dimensional information.

8. The image analysis device according to claim 1, wherein the processor is configured to:

execute the discrimination processing of the background reflection; and execute processing including at least one of the suppression processing or the enhancement processing of the background reflection based on at least a discrimination result of the background reflection.

9. An image analysis method that is executed by a processor, the method comprising:

a step of acquiring a first infrared thermal image and a second infrared thermal image obtained by imaging an object from different imaging positions, respectively; and a step of executing processing including at least one of discrimination processing, suppression processing, or enhancement processing of background reflection of infrared light from a periphery of the object on an infrared thermal image obtained by imaging the object based on at least a difference between a temperature distribution of the first infrared thermal image and a temperature distribution of the second infrared thermal image.

10. A non-transitory, computer-readable tangible recording medium which records thereon a program that causes, when read by a computer, the computer to realize:

a function of acquiring a first infrared thermal image and a second infrared thermal image obtained by imaging an object from different imaging positions, respectively; and a function of executing processing including at least one of discrimination processing, suppression processing, or enhancement processing of background reflection of infrared light from a periphery of the object on an infrared thermal image obtained by imaging the object based on at least a difference between a temperature distribution of the first infrared thermal image and a temperature distribution of the second infrared thermal image.

* * * * *